US012152355B2

(12) United States Patent
Bergeron et al.

(10) Patent No.: US 12,152,355 B2
(45) Date of Patent: Nov. 26, 2024

(54) ROADWAY DEBRIS CLEARING SYSTEM

(71) Applicant: IC INNOVATIONS LLC, Wilmington, DE (US)

(72) Inventors: George Bergeron, Brookhaven, GA (US); Ryan Davids, Arvada, CO (US)

(73) Assignee: IC INNOVATIONS LLC, Wilmington, DE (US)

(*) Notice: Subject to any disclaimer, the term of this patent is extended or adjusted under 35 U.S.C. 154(b) by 797 days.

(21) Appl. No.: 17/296,124

(22) PCT Filed: Sep. 25, 2020

(86) PCT No.: PCT/US2020/052647
§ 371 (c)(1),
(2) Date: May 21, 2021

(87) PCT Pub. No.: WO2021/062104
PCT Pub. Date: Apr. 1, 2021

(65) Prior Publication Data
US 2022/0010510 A1 Jan. 13, 2022

Related U.S. Application Data

(60) Provisional application No. 62/905,832, filed on Sep. 25, 2019.

(51) Int. Cl.
*E01H 1/10* (2006.01)
*E01H 5/06* (2006.01)
(52) U.S. Cl.
CPC ............. *E01H 1/105* (2013.01); *E01H 5/061* (2013.01); *E01H 5/06* (2013.01)

(58) Field of Classification Search
CPC ........... E01H 5/06; E01H 5/065; E01H 5/061; E01H 5/066; E01H 1/105; E02F 3/7631
See application file for complete search history.

(56) References Cited

U.S. PATENT DOCUMENTS 4,279,084 A * 7/1981 Low .......................... E01H 5/06
37/236
4,306,362 A * 12/1981 Waterman ................. E01H 4/02
37/219

(Continued)

OTHER PUBLICATIONS

International Preliminary Report on Patentability for International (PCT) Patent Application No. PCT/US2020/052647, dated Apr. 7, 2022 8 pages.

(Continued)

*Primary Examiner* — Jessica H Lutz
(74) *Attorney, Agent, or Firm* — Sheridan Ross P.C.

(57) ABSTRACT

The present disclosure relates generally to a roadway debris clearing system that can be concealed within, or behind, a standard push bumper of a safety patrol vehicle. The roadway debris clearing system may include a debris clearing device that is disposed between the vehicle motor and the front bumper. The debris clearing device can be deployed from a retracted position to an extended position where the device is capable of pushing debris from a roadway. The debris clearing device, when in the retracted position, may be concealed behind the front bumper of the vehicle. The roadway debris clearing system includes a camera system to observe an area in front of the vehicle as well as under the front bumper while clearing debris using the debris clearing device.

20 Claims, 17 Drawing Sheets

(56) References Cited

U.S. PATENT DOCUMENTS

| | | | | |
|---|---|---|---|---|
| 6,354,024 | B1 * | 3/2002 | Kost | E01H 5/066 |
| | | | | 37/231 |
| 6,834,899 | B2 * | 12/2004 | Lindsey | B60R 19/483 |
| | | | | 293/118 |
| 7,188,875 | B2 * | 3/2007 | Norelius | B60R 19/565 |
| | | | | 293/118 |
| 9,783,153 | B2 * | 10/2017 | Farooq | B60R 19/023 |
| 10,173,621 | B2 * | 1/2019 | Oliver | B60R 19/565 |
| 10,179,982 | B2 * | 1/2019 | Prasad | G05D 1/0278 |
| 10,654,434 | B2 * | 5/2020 | Rodriguez | B60R 19/023 |
| 11,718,253 | B1 * | 8/2023 | Gomariz | B60R 19/023 |
| | | | | 293/118 |
| 11,827,168 | B2 * | 11/2023 | Farooq | B60R 19/40 |
| 11,970,122 | B2 * | 4/2024 | Glickman | B60R 19/12 |
| 2011/0067274 | A1 | 3/2011 | Stevens et al. | |
| 2013/0025629 | A1 * | 1/2013 | Vigneault | E01H 5/065 |
| | | | | 15/236.01 |
| 2014/0231110 | A1 | 8/2014 | May | |
| 2016/0138233 | A1 | 5/2016 | Barker et al. | |
| 2017/0218597 | A1 | 8/2017 | Holman | |
| 2018/0127935 | A1 * | 5/2018 | Paonessa | E01H 5/065 |
| 2022/0010511 | A1 * | 1/2022 | D'Urso | E01H 5/061 |

OTHER PUBLICATIONS

Official Action for Canada Patent Application No. 3,151,302, dated May 3, 2023 3 pages.
International Search Report and Written Opinion prepared by the United States Patent Office on Nov. 11, 2020, for International Application No. PCT/US2020/052647.

\* cited by examiner

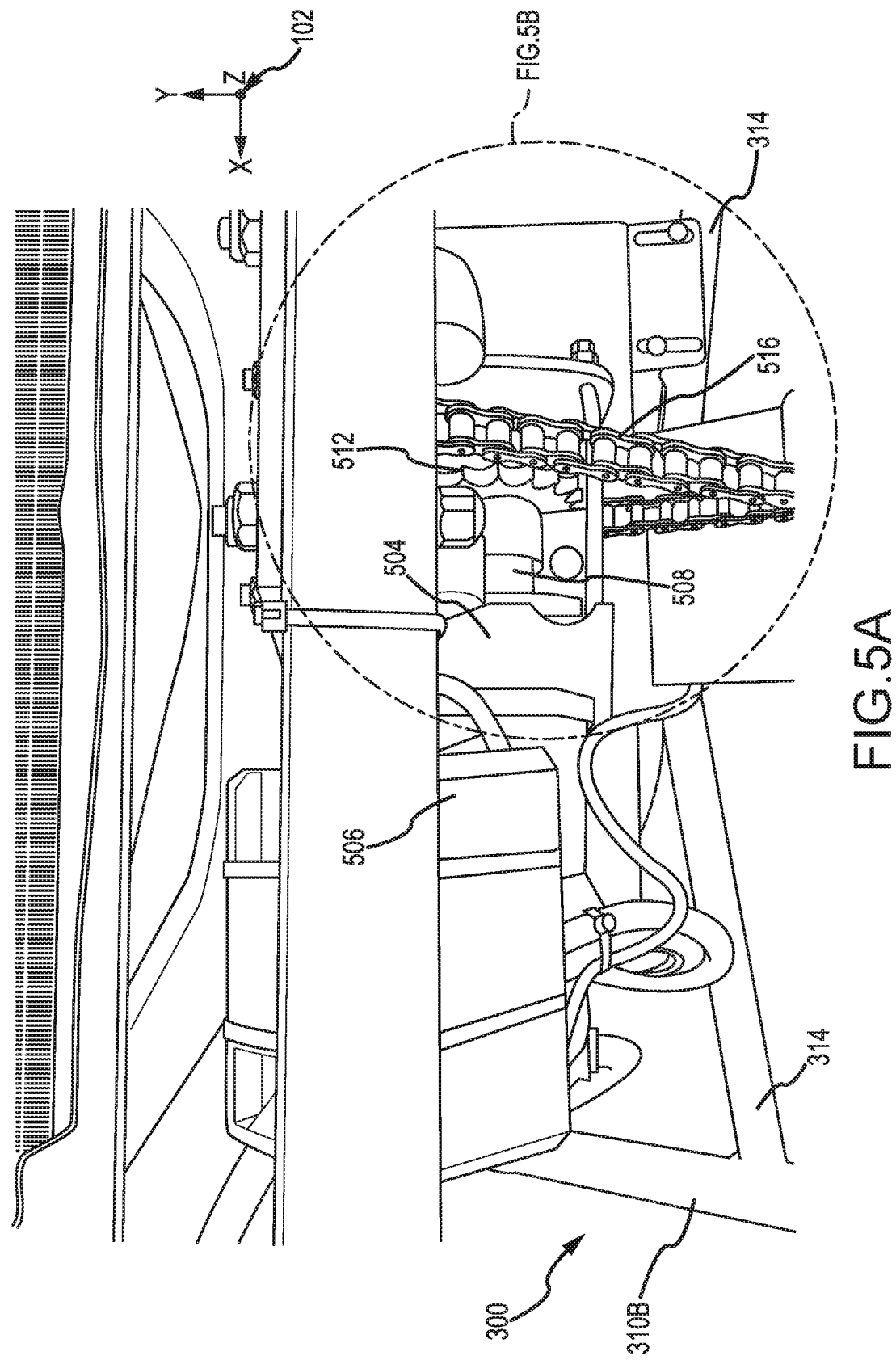

ROADWAY DEBRIS CLEARING SYSTEM

CROSS-REFERENCE TO RELATED APPLICATIONS

This application is a national stage application under 35 U.S.C. § 371 and claims the benefit of PCT Application No. PCT/US2020/052647 having an international filing date of 25 Sep. 2020, which designated the United States, and which PCT application claimed the benefit of priority under 35 U.S.C. § 119(e) to U.S. Provisional Patent Application Ser. No. 62/905,832, filed 25 Sep. 2019, the entire disclosure of each of which is hereby incorporated herein by reference, in its entirety, for all that it teaches and for all purposes.

BACKGROUND

The present disclosure is generally directed to debris clearing systems and, in particular, toward vehicle-mounted debris clearing devices.

Keeping a roadway clear of debris is critical in maintaining a safe and functioning transportation system. Debris can interfere with traffic, collect in emergency lanes, clog drainage areas, and generally pose a hazard to vehicles traveling along a roadway. Unsecured loads, vehicle collisions, or other accidents may contribute to a majority of the debris found on a roadway.

Public and private groups employ a number of different maintenance crews and machines to address the removal and clearing of debris from a roadway. A group may have a first vehicle that is capable of towing, pushing, and servicing vehicles, a second vehicle that is capable of plowing snow and/or pushing debris from a portion of a roadway, and a third vehicle that is capable of sweeping the roadway clear of small debris, sand, glass, and/or the like.

In the event of an accident, especially a collision between vehicles, debris from the vehicles involved may litter a portion of the roadway. In response, the first vehicle may be called to push a vehicle from the roadway while the second vehicle may be called to plow large debris from the roadway. As can be appreciated, neither vehicle can perform the function of the other. This conventional approach to clearing debris from a roadway requires multiple vehicles to be called to a scene, increasing the amount of time to respond, increasing the number of vehicles on scene, and increasing the time required to return the roadway to a fully-operational (e.g., pre-accident) state.

In some cases, the conventional approach also may require first responders to exit their vehicles in order to clear or remove debris from the scene. Upon exiting their vehicles, the first responders are exposed to the environment of the scene and are naturally at a greater risk of harm (e.g., due to secondary incidents, exposure to the elements, accidents, and/or the like). Accordingly, there is a need for a debris clearing system that protects the lives of first responders clearing a scene of debris by allowing the first responders to remain safely inside their vehicles while performing response activities.

BRIEF SUMMARY

It is with respect to the above issues and other problems that the embodiments presented herein were contemplated. It is an object of the present disclosure to protect the lives of first responders by providing a debris clearing device that can be deployed and operated from inside the vehicle. In general, embodiments of the present disclosure provide a roadway debris clearing system for a vehicle that can be concealed within a standard push bumper of a safety patrol vehicle and allows first responders to remain safely inside the vehicle while clearing debris. As can be appreciated, the ability to operate and clear debris while remaining inside a vehicle reduces the risk of potential harm to operators and saves lives.

In some embodiments, the roadway debris clearing system may include a debris clearing device that is disposed between the vehicle motor and the front bumper. The debris clearing device can be deployed from a retracted position (e.g., behind the bumper) to an extended position (e.g., lowered from the position behind the bumper) where the device is capable of pushing debris from a roadway. In some embodiments, the debris clearing device, in the retracted position, may be substantially (if not completely) concealed behind the front bumper of the vehicle. The debris clearing device may be deployed from inside the vehicle by actuation of a control switch. Upon actuating the control switch, the debris clearing device lowers into position such that a lower portion of the debris clearing device is maintained in the lowered position offset from the roadway surface. The offset may provide a clearance amount (e.g., between approximately 0.125 inches and 1.00 inch, etc.) allowing at least one blade of the debris clearing device to collect and/or direct debris from the roadway. Depending on the type of roadway, the type of debris, and/or other conditions, the offset may be set to a desired amount. In one embodiment, the offset may be set to provide 0.50 inches of ground clearance between the roadway surface and the debris clearing device.

In some embodiments, the debris clearing device may include a welded blade assembly comprising a primary pushing blade portion and at least one angled blade portion. The primary pushing blade portion may be substantially parallel to a surface of the front bumper of the vehicle. In this disposition, the vehicle may move debris in a predictable direction as the vehicle travels. The angled blade portions may be disposed at edges of the debris clearing device and, in some cases, disposed at edges of the vehicle or the bumper of the vehicle. The angle of the blade portions may substantially match the angle of the edges of the front bumper of the vehicle. The angled blade portions may be used to push debris at an angle relative to vehicle. For example, the angled blade portions may push debris clear of the vehicle wheels in a direction away from the center of the vehicle. This disposition of the angled blade portions and other portions of the debris clearing device can provide a substantially clear path, the width of the vehicle, for the vehicle or other vehicles to follow as the vehicle moves through debris with the debris clearing device 110 extended.

In one embodiment, the welded blade assembly may include a number of claws, or serrated fingers, disposed at edges of the debris clearing device, between blade portions, and/or combinations thereof. These claws may be arranged on the debris clearing device substantially perpendicular to the primary pushing blade portion surface or the front bumper surface (e.g., facing forward). The claws may serve to collect and/or grip debris in an area between the edges of the debris clearing device. Without these claws, debris may drift from the debris clearing device as the vehicle moves through the debris with the device extended. However, as the vehicle moves through debris with the device extended, the claws provide edges, or lips, that debris can catch on. The serrated portions of these edges may provide an increased surface area for debris, of various sizes and shapes, to catch on. As can be appreciated, the claws allow the vehicle and the debris clearing device to have a more controllable movement of the debris than a device without the claws.

The roadway debris clearing system may include one or more cameras disposed relative to the debris clearing device. In one embodiment, the roadway debris clearing system may include a first camera that views an area of the vehicle in front of the debris clearing device. The images collected by the first camera may be rendered to a screen of a display device inside the vehicle. Among other things, the first camera may provide images of the debris disposed ahead of the vehicle. Based on these images, a driver can orient the vehicle, and the debris clearing device, relative to the debris to be collected. In some embodiments, the roadway debris clearing system may include a second camera that views an area, and/or an edge of the blade, of the deployed debris clearing device. The second camera may allow a driver of the vehicle to verify that the debris is captured in the debris clearing device and is being appropriately cleared from the roadway. The images collected by the first and second cameras may be displayed to the display device simultaneously. For example, the display device may include a first portion for rendering the images from the first camera and a second portion for rendering the images from the second camera. The first and second portions of the screen of the display device may be separated by a partition. In some embodiments, the first and second portions may be disposed side-by-side, stacked (above and below), overlapping (e.g., picture-in-picture), combinations thereof, and/or the like. In one embodiment, the cameras may provide the images to the display device when the debris clearing device is deployed from the retracted state to the extended, or lowered, state.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Additional features and advantages are described herein and will be apparent from the following Detailed Description and the figures.

BRIEF DESCRIPTION OF THE SEVERAL VIEWS OF THE DRAWINGS

FIG. 5A is a first perspective detail view of a motor-driven lift actuator of the blade mount and actuator assembly of the roadway debris clearing system in accordance with embodiments of the present disclosure;

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
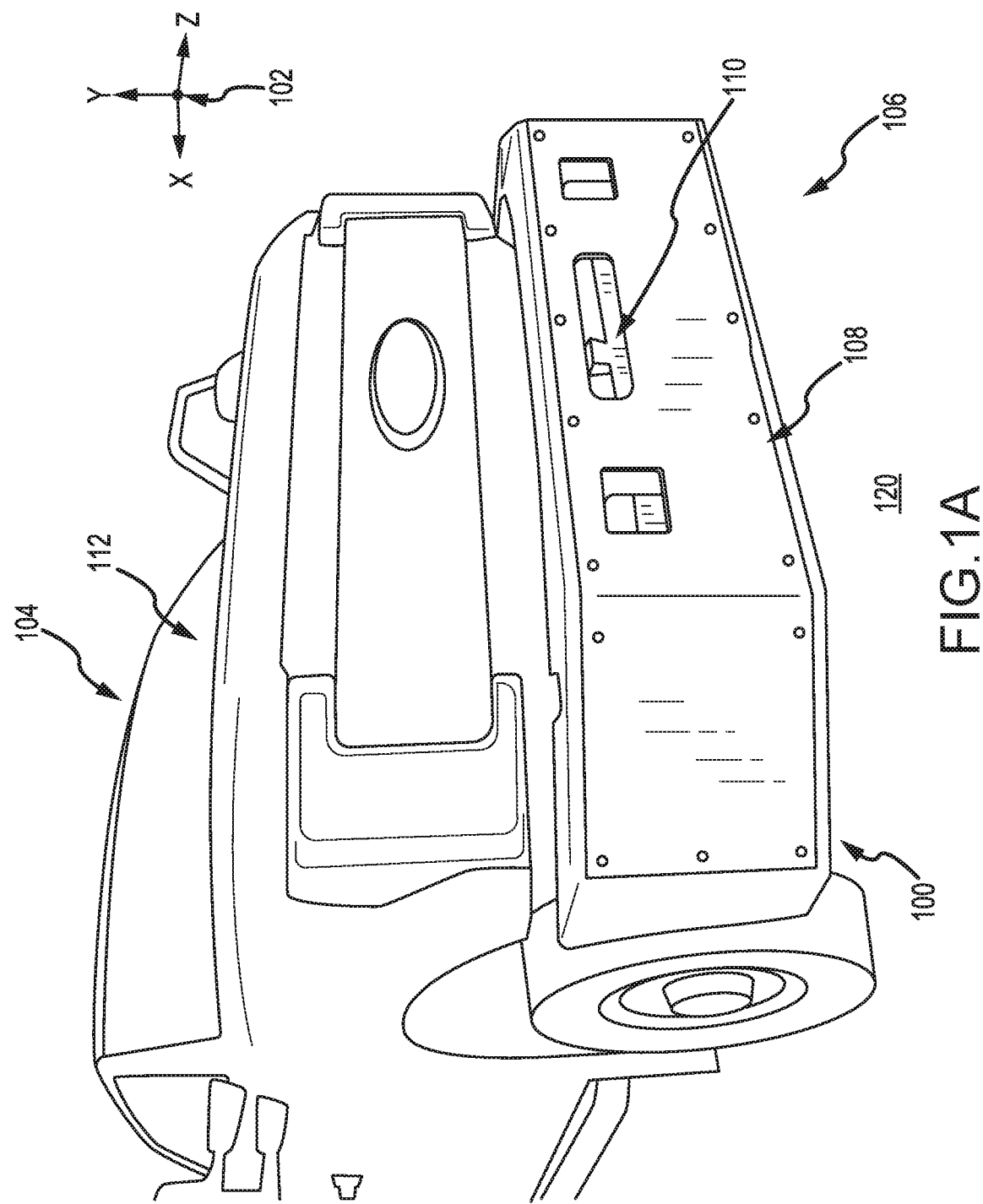
FIG. 1A is a perspective view of the roadway debris clearing system mounted to a safety patrol vehicle in accordance with embodiments of the present disclosure.
Figure 1B:
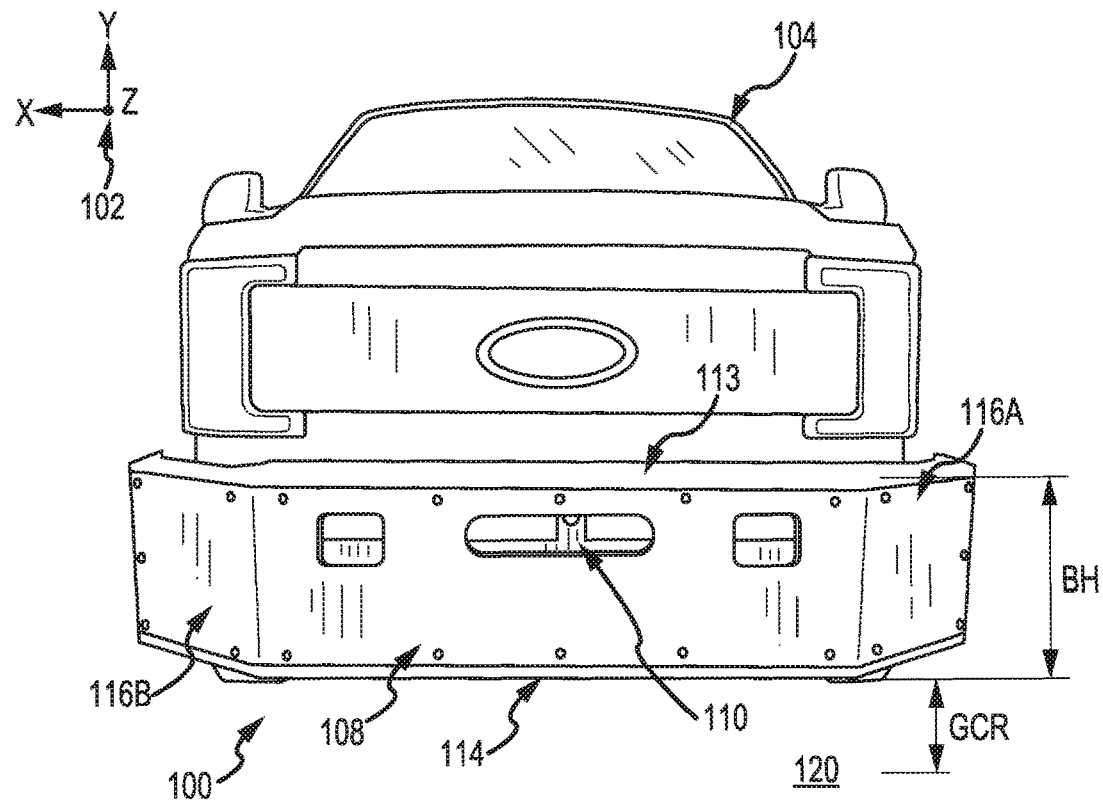
FIG. 1B is a front elevation view of the roadway debris clearing system mounted to the safety patrol vehicle in a retracted state in accordance with embodiments of the present disclosure.
Figure 1C:
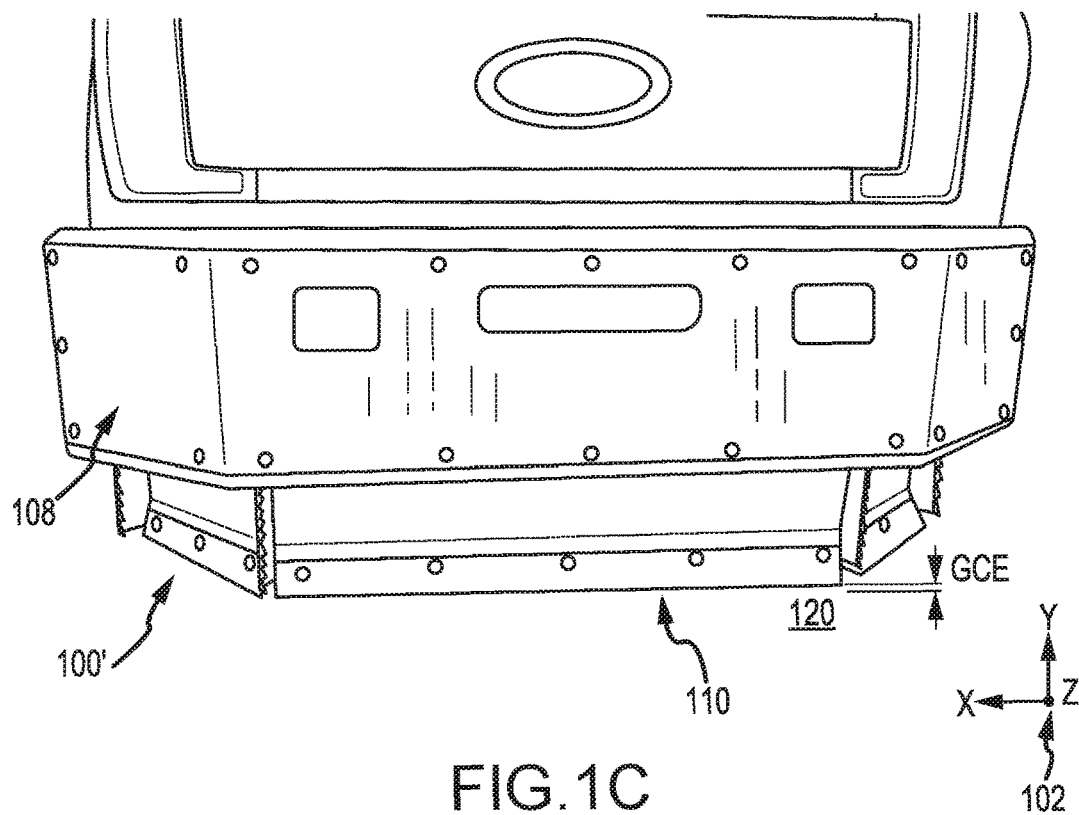
FIG. 1C is a front elevation view of the roadway debris clearing system mounted to the safety patrol vehicle in an extended state in accordance with embodiments of the present disclosure.

FIGS. 1A-1C show various views of the roadway debris clearing system 100 in accordance with embodiments of the present disclosure. The roadway debris clearing system 100 comprises a debris clearing device 110 mounted to a vehicle 104. In particular, the debris clearing device 110 is mounted behind the front push bumper 108 of the vehicle 104. In some embodiments, the debris clearing device 110 may be mounted to the frame or chassis of the vehicle 104 and may be selectively deployed from a retracted position behind the front push bumper 108. In one embodiment, a driver or other user of the vehicle 104 inside the vehicle interior 112 may control a control switch to actuate the debris clearing device 110 from the retracted position to the extended (e.g., lowered or deployed) position.

Features of the roadway debris clearing system 100 may be described in conjunction with a coordinate system 102. The coordinate system 102, as shown in the figures, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the roadway debris clearing system 100. These planes may be disposed orthogonal, or at 90 degrees, to one another. While the origin of the coordinate system 102 may be placed at any point on or near the components of the roadway debris clearing system 100, for the purposes of description, the axes of the coordinate system 102 are always disposed along the same directions from figure to figure. In some examples, reference may be made to dimensions, angles, directions, relative positions, and/or movements associated with one or more components of the roadway debris clearing system 100 with respect to the coordinate system 102. For example, the width of the vehicle 104 may be defined as a dimension along the X-axis of the coordinate system 102, the height of the vehicle 104 may be defined as dimension along the Y-axis of the coordinate system 102, and the length of the vehicle 104 may be defined as a dimension along the Z-axis of the coordinate system 102. Additionally or alternatively, the width of the debris clearing device 110 may be defined as a dimension along the X-axis of the coordinate system 102, the height of the debris clearing device 110 may be defined as dimension along the Y-axis of the coordinate system 102, and the depth of the debris clearing device 110 may be defined as a dimension along the Z-axis of the coordinate system 102.

As shown in FIGS. 1A-1B, the debris clearing device 110 is in a retracted, or non-deployed, state behind the front push bumper 108. In the retracted state, the vehicle 104 may drive to the scene of an incident (e.g., an accident, collision, etc.) and perform safety services as required by the vehicle 104. While the debris clearing device 110 is retracted, the vehicle 104 may push other vehicles disposed in the front of vehicle 106 with the front push bumper 108, tow vehicles, and/or provide other services.

The front push bumper 108 of the vehicle 104 may have a bumper height, BH, running from an upper edge 113 to a lower edge 114 of the front push bumper 108. The distance between the lower edge 114 of the front push bumper 108 and the roadway surface 120 may correspond to the ground clearance, GCR, of the roadway debris clearing system 100 while the debris clearing device 110 is retracted. The ground clearance, GCR, in the retracted state may correspond to a distance between the debris clearing device 110 and the roadway surface 120. In one embodiment, this distance between the debris clearing device 110 and the roadway surface 120 may be greater than 3.0 inches, and may be 4.0 inches or more. In some embodiments, the debris clearing device 110 may be arranged behind the front push bumper 108 and completely disposed between the upper edge 113 and the lower edge 114 of the bumper 108 when in the retracted state. In one embodiment, the lowermost portion of the debris clearing device 110 may extend slightly (e.g., from approximately 0.25 inches to 3.00 inches, etc.) past the lower edge 114 (e.g., in a direction toward the roadway surface 120, etc.) of the front push bumper 108 in the retracted state. In some embodiments, the overall height of the debris clearing device 110 may be less than the bumper height, BH.

The front push bumper 108 may comprise a substantially planar front pushing surface that runs along a width direction of the vehicle. The front push bumper 108 may comprise a first angled corner 116A disposed on a first end of the substantially planar front pushing surface and a second angled corner 116B disposed on a second end of the substantially planar front pushing surface. In some embodiments, the debris clearing device 110 may comprise a plurality of surfaces that conform to, or match, the surfaces of the front push bumper 108.

FIG. 1C shows a front elevation view of the extended state of the roadway debris clearing system 100' in accordance with embodiments of the present disclosure. When deployed, the debris clearing device 110 of the system 100 moves from a position at least partially behind the front push bumper 108 into a space below the lower edge 114 of the bumper 108 (e.g., between the lower edge 114 and the roadway surface 120, etc.). While the debris clearing device 110 is deployed, the vehicle 104 may push debris and/or other objects on the roadway surface 120. For instance, any debris that collects on the roadway surface 120 and falls within the ground clearance distance, GCR, of the front push bumper 108 may be pushed, directed, and/or cleared from the roadway surface 120 by the debris clearing device 110. As shown in FIG. 1C, the debris clearing device 110 may be deployed into an operating (e.g., debris clearing, etc.) position (e.g., the extended state of the roadway debris clearing system 100', etc.) such that the lowermost portion of the debris clearing device 110 is disposed a distance, GCE, above the roadway surface 120. In some embodiments, the ground clearance, GCE, between the extended debris clearing device 110 and the roadway surface 120 may be approximately 0.50 inches or some other predetermined dimension. In one embodiment, the distance, GCE, may be set depending on road conditions, debris size, and/or other factors. In some cases, the debris clearing device 110 may be lowered to a position such that the lowermost portion of the debris clearing device 110 contacts the roadway surface 120.

Figure 2A:
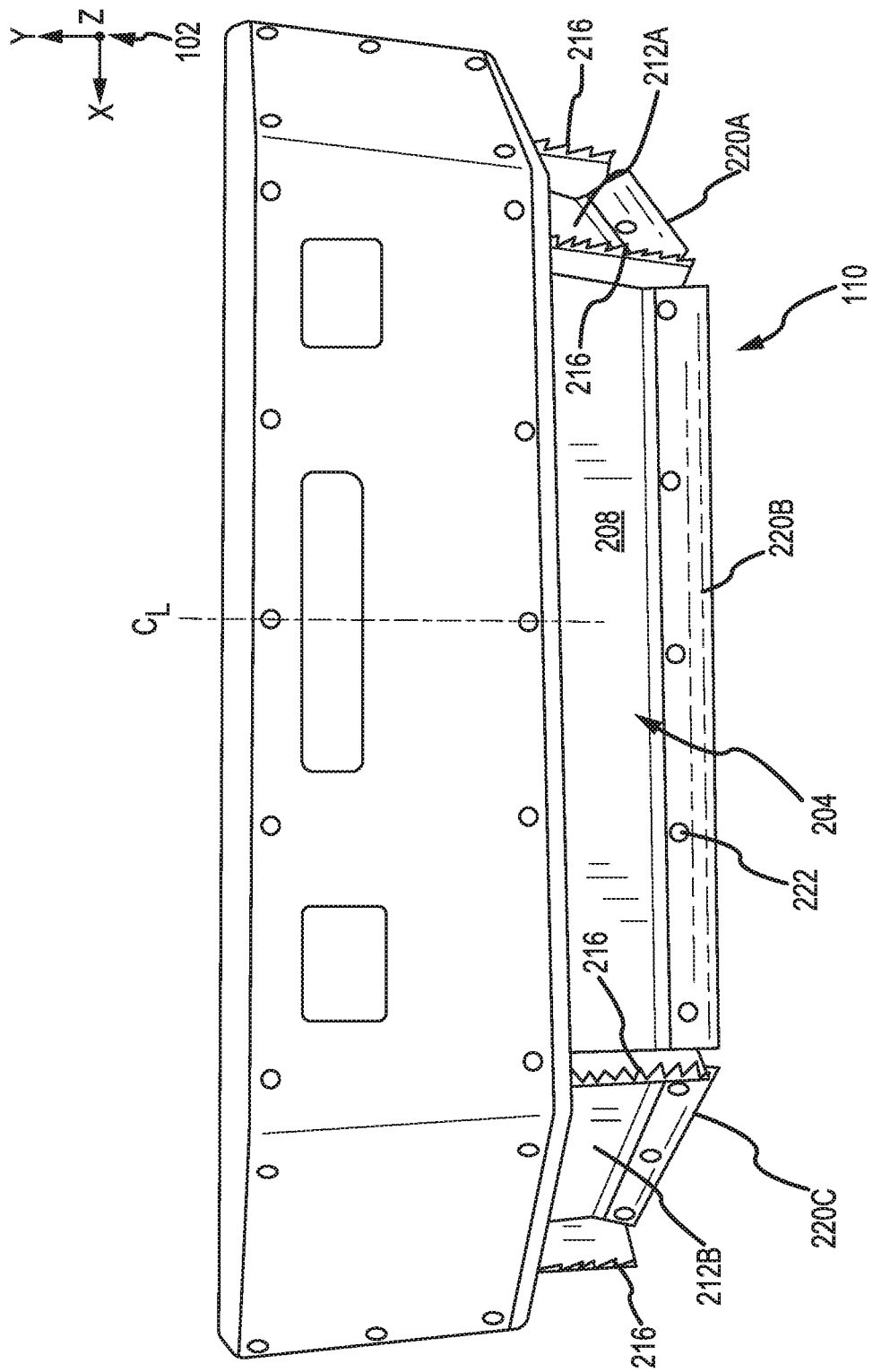
FIG. 2A is a front elevation view of a debris clearing device in accordance with embodiments of the present disclosure.

Referring now to FIG. 2A, a front elevation view of the debris clearing device 110 is shown in accordance with embodiments of the present disclosure. The debris clearing device 110 may comprise a blade assembly 204 and one or more blade edges 220A-220C fastened to a portion of the blade assembly 204 via one or more fasteners 222 (e.g., bolts, screws, pins, clamps, etc.). The blade edges 220A-220C may correspond to replaceable metal (e.g., steel, etc.) bars that are configured to wear and/or protect the lower portion of the blade assembly 204. The blade edges 220A-220C may each be disposed at an angle relative to the roadway surface 120 to direct debris toward the blade assembly 204 and prevent jams between the one or more blade edges 220A-220C and the roadway surface 120.

The blade assembly 204 may comprise a front blade portion 208 and at least one angled blade portion 212A-212B. As illustrated in FIG. 2A, the blade assembly 204 comprises two angled blade portions 212A-212B. The first angled blade portion 212A is disposed on a first end of the front blade portion 208 and/or the debris clearing device 110 and the second angled blade portion 212B is disposed on an opposite second end of the front blade portion 208 and/or the debris clearing device 110. The blade portions 212A-212B may be welded to the front blade portion 208 and disposed at an angle running in a direction toward a rear of the vehicle 104 and away from a center of the vehicle 104. In some embodiments, the debris clearing device 110 may be substantially symmetrical about the centerline, CL, of the vehicle 104. The first blade edge 220A is attached to the first angled blade portion 212A, the second blade edge 220B is attached to the front blade portion 208, and the third blade edge 220C is attached to the second angled blade portion 212B. As provided above, the blade edges 220A-220C may be attached to the respective blade portions 208, 212A-212B via one or more fasteners 222.

It is an aspect of the present disclosure that the debris clearing device 110 may comprise a number of claw portions 216 attached to the blade assembly 204. For instance, the claw portion 216 may correspond to a bent plate of metal welded to the blade assembly 204 such that a portion of the claw portions 216 face forward toward the front of vehicle 106. Each claw portion 216 may include a series of serrated protrusions, or teeth, disposed along an edge of the plate. These serrated protrusions may face forward or angle toward the center of the vehicle 104. The claw portion 216 may provide an interrupted surface along the edge of each plate to contain and/or guide debris between the ends of the debris clearing device 110. In some embodiments, the claw portions 216 may be attached at outermost ends of the angled blade portions 212A-212B and/or at a point between each angled blade portion 212A-212B and the front blade portion 208.

Figure 2B:
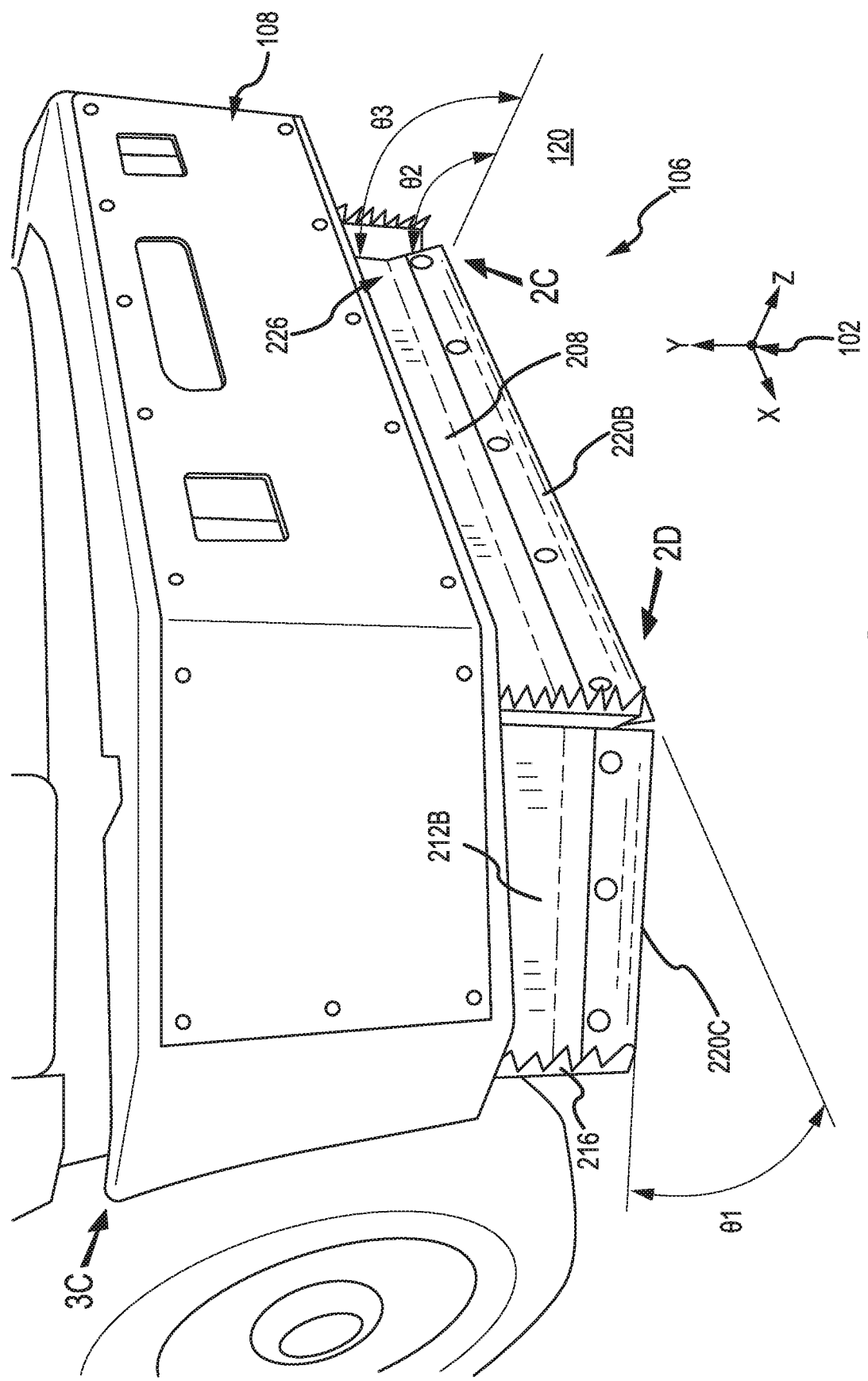
FIG. 2B is a perspective detail view of an angled portion of the debris clearing device of FIG. 2A.

As shown in FIG. 2B, the blade portions 212A-212B may be formed from, and/or welded to, the front blade portion 208 at first angle, $\Theta 1$, running in a direction toward a rear of the vehicle 104 and away from a center of the vehicle 104 and/or blade assembly 204. The first angle, $\Theta 1$, of the blade portions 212A-212B may substantially match an angle of a corresponding angled corner 116A of front push bumper 108. In some embodiments, the first angle, $\Theta 1$, may be between 10 degrees and 45 degrees. In one embodiment, the first angle, $\Theta 1$, may be between 45 degrees and 60 degrees. In one embodiment, the first angle, $\Theta 1$, may be between 60 degrees and 80 degrees. In some embodiments, the first angle, $\Theta 1$, may be set to any angle between 10 degrees and 80 degrees.

The blade assembly 204 may comprise a number of metal plates that are bent and/or welded together to form the various pushing surfaces, angles, and contact areas described herein. In some embodiments, each blade portion 208, 212A-212B may comprise multiple plates or portions of plates disposed at angles relative to one another. The front blade portion 208, for instance, may comprise a lower portion that is disposed at a second angle, $\Theta 2$, relative to the roadway surface 120. In some embodiments, the second angle, $\Theta 2$, may be an obtuse angle, for example, an angle that is greater than 90 degrees. A central portion of the front blade portion 208 may be disposed at a third angle, $\Theta 3$, relative to the roadway surface 120. In some embodiments, the third angle, $\Theta 3$, may be substantially perpendicular to the roadway surface 120 (e.g., approximately equal to 90 degrees, plus or minus several degrees). However, in some cases, the third angle, $\Theta 3$, may be an acute angle less than 90 degrees or an obtuse angle greater than 90 degrees. In any event, the angles of the portions making up the blade assembly 204 may be set to control debris contacting the surfaces of the assembly 204. The other blade portions 212A-212B may have similar, if not identical, second and third angles, $\Theta 2$-$\Theta 3$, relative to the roadway surface 120.

Once welded, the blade assembly 204 may be plated (e.g., nickel plated, chrome plated, etc.), oxidized (e.g., black oxide, red oxide, passivating, etc.), coated with paint, epoxy coated, and/or powder coated, etc., to protect the metal. Additionally or alternatively, the coating of the blade assembly 204 may serve to identify a vehicle 104 including the roadway debris clearing system 100. For instance, at least one portion of the debris clearing device 110 (e.g., the blade assembly 204, etc.) may be coated in a "safety yellow," "orange," "neon green," "red," or other color that identifies the vehicle 104 as having the roadway debris clearing system 100. In some embodiments, the coating color of the debris clearing device 110 may be observed from the front of vehicle 106, under the front push bumper 108, and/or through cutouts disposed in the front push bumper 108.

Figure 2D:
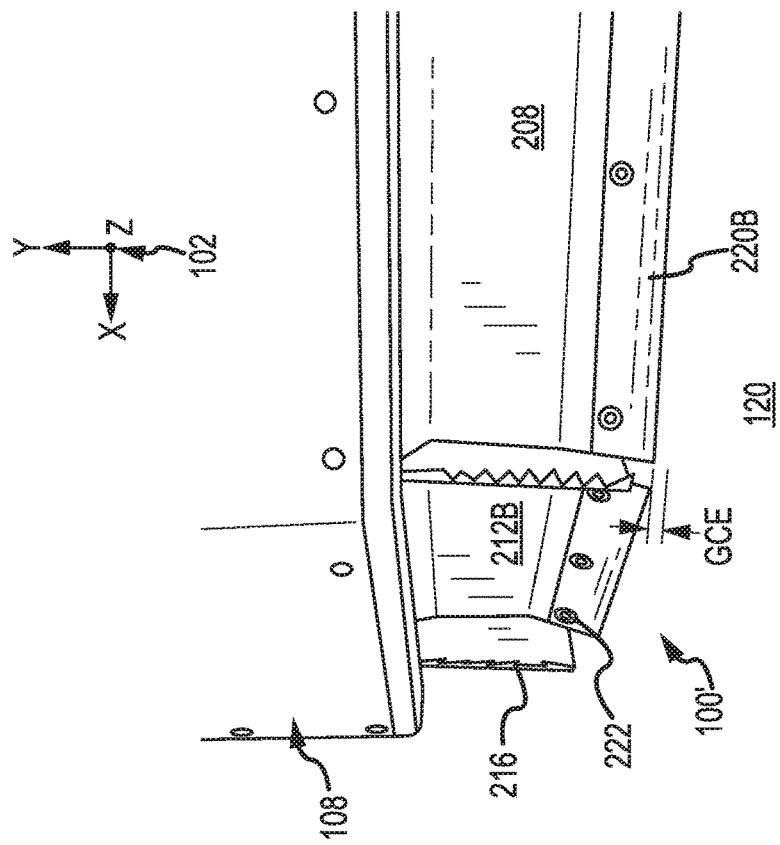
FIG. 2D is a perspective detail view of the extended debris clearing device relative to a roadway surface in accordance with embodiments of the present disclosure.
Figure 2C:
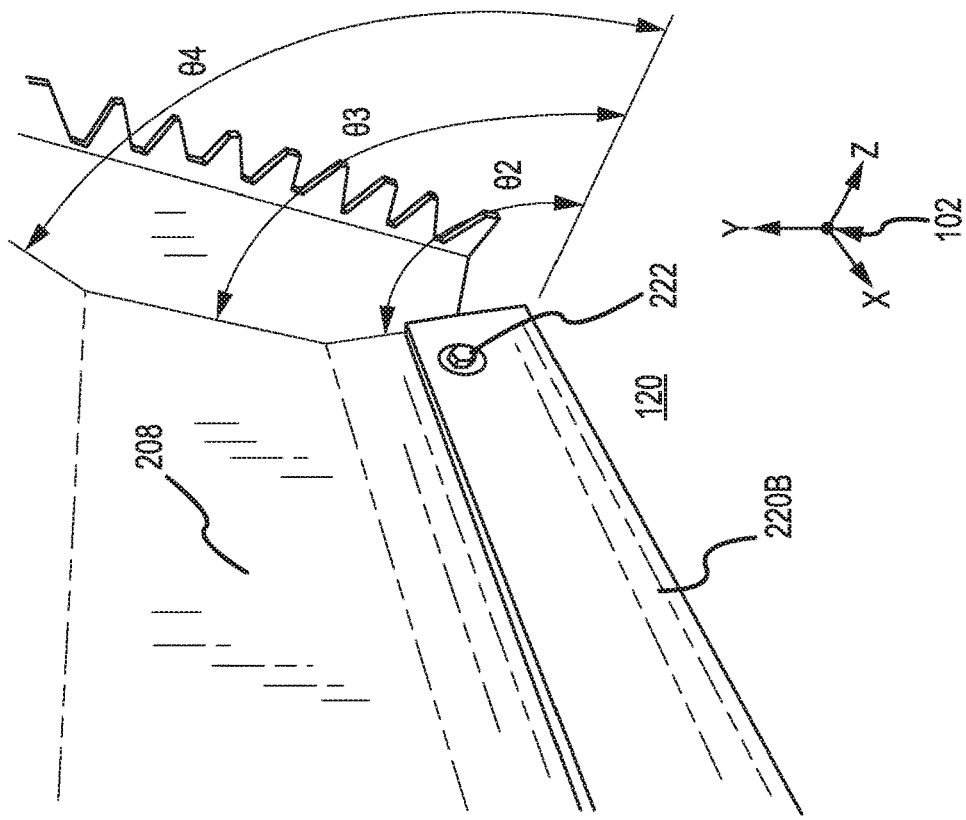
FIG. 2C is a perspective detail view of a blade portion end area of the debris clearing device of FIG. 2B.

FIG. 2C shows a perspective detail view of a blade portion end area 226 of the debris clearing device 110 illustrated in FIG. 2B, as taken from view arrow 2C illustrated in FIG. 2B. As shown in FIG. 2C, the blade assembly 204 and, more specifically, the front blade portion 208 may include an upper portion that is disposed at a fourth angle, $\Theta 4$, relative to the roadway surface 120. In some embodiments, the fourth angle, $\Theta 4$, may be substantially perpendicular to the roadway surface 120 (e.g., approximately equal to 90 degrees) or disposed at an acute angle relative to the roadway surface 120 (e.g., approximately less than 90 degrees). Disposing this upper portion of the front blade portion 208 at an acute angle relative to the roadway surface 120 may control debris from raising under the front push bumper 108 of the vehicle 104 and keep the debris moving in front of the vehicle 104 (e.g., in a direction below the lower edge 114 of the front push bumper 108, etc.). Stated another way, the disposition of the various angles, $\Theta 1$-$\Theta 4$, described herein may control the movement of debris as the debris clearing device 110 contacts the debris while the vehicle 104 is moving forward and/or plowing through debris. In some embodiments, the angles of the front blade portion 208 may provide a concave cross-section (e.g., curving inwardly toward the rear of the blade assembly 204, etc.) running along the width of the front blade portion 208.

FIG. 2D shows a perspective detail view showing the extended debris clearing device 110 offset approximately 0.5 inches from the roadway surface 120, as taken from view arrow 2D illustrated in FIG. 2B. In this position, the debris clearing device 110 may contact and clear debris as the vehicle 104 moves in a substantially forward direction. In one embodiment, the second blade edge 220B may be offset from, or not in contact with, the roadway surface 120 while the debris clearing device 110 is contacting and clearing debris or other objects as the vehicle 104 moves forward along the roadway surface 120.

FIGS. 3A-3G show various views of a blade mount and actuator assembly 300 of the debris clearing device 110 in accordance with embodiments of the present disclosure.

Figure 3A:
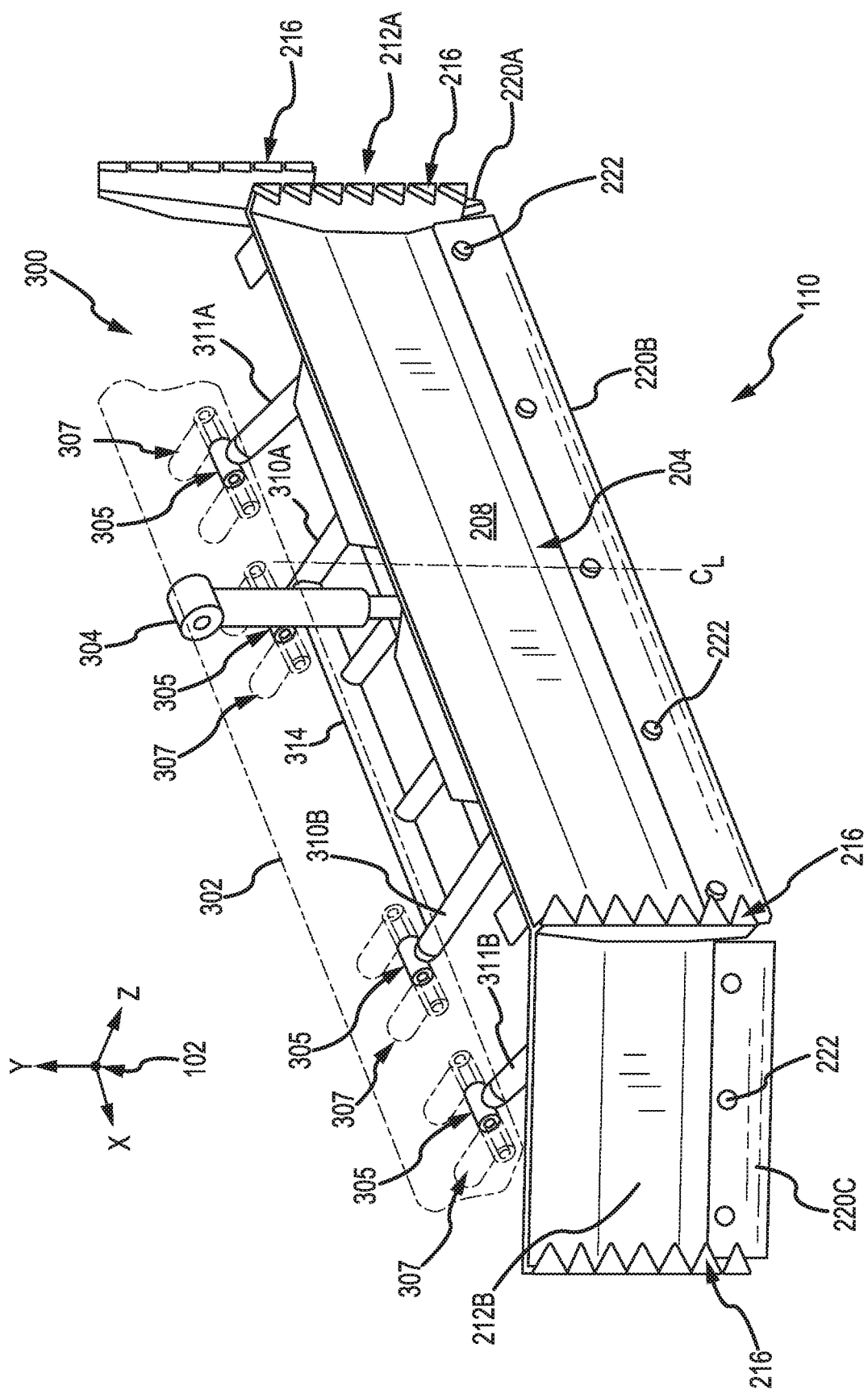
FIG. 3A is a front perspective view of the blade mount and actuator assembly of the roadway debris clearing system in accordance with embodiments of the present disclosure.
Figure 3B:
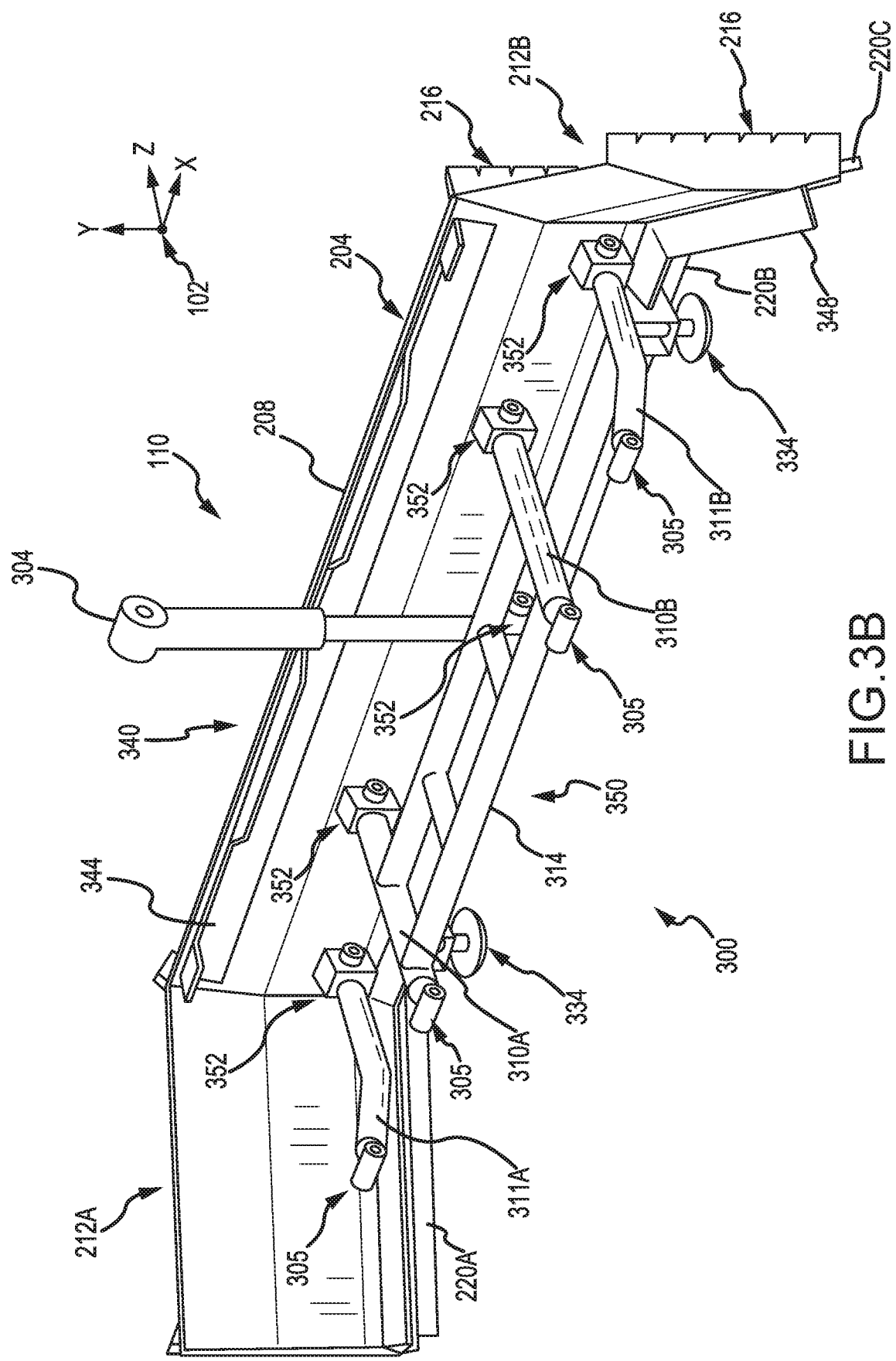
FIG. 3B is a rear perspective view of the blade mount and actuator assembly of the roadway debris clearing system in accordance with embodiments of the present disclosure.

FIGS. 3A-3B show the blade mount and actuator assembly 300 and the blade assembly 204 debris clearing device 110 with the front push bumper 108 and other portions of the vehicle 104 removed for clarity. The blade mount and actuator assembly 300 of the debris clearing device 110 may attach to the vehicle frame 302 via a pivotable attachment between one or more blade assembly pivot mounts 305 and corresponding vehicle frame mounts 307. In some embodiments, the blade mount and actuator assembly 300 may comprise a mount frame that attaches to the vehicle frame 302. In one embodiment, the mount frame and/or the vehicle frame mounts 307 may attach to an existing vehicle frame 302, or chassis, of a vehicle 104, without substantial modification to the vehicle frame 302 (e.g., retrofit). The blade mount and actuator assembly 300 may comprise a number of lift arms 310A-311B and crossbars 314 that form a moveable lifting framework that translates the blade assembly 204 from a retracted position (e.g., at least partially concealed by the front push bumper 108, etc.) into a deployed (e.g., extended) position. In some embodiments, the blade assembly 204 may be vertically concealed within the bumper height of the front push bumper 108 in the retracted state. In one embodiment, the blade assembly 204 may be positioned behind a front surface of the front push bumper 108 when in the retracted state and when in the extended state.

In one embodiment, the lift arms 310A-311B may attach at respective first ends to the vehicle frame 302. The attachment may correspond to a pinned attachment that allows for rotational movement of the lift arms 310A-311B relative to the vehicle frame 302. For instance, this attachment may be a clevis mount, where the vehicle frame mounts 307 correspond to the clevis and the blade assembly pivot mounts 305 correspond to a tang that inserts between opposing wall portions of the clevis. The blade assembly pivot mounts 305 may be pivotably attached to the clevis via clevis pins (e.g., bolts, shoulder bolts, pins, cotter pin bolts, etc.) that run through the blade assembly pivot mounts 305 and respective vehicle frame mounts 307.

As shown in FIG. 3B, the lift arms 310A-311B may attach at respective second ends to the blade assembly 204 via arm pivot mounts 352. the arm pivot mounts 352 may be fixed to the blade assembly 204 (e.g., the rear surface of the front blade portion 208) but allow rotation of the lift arms 310A-311B relative to the blade assembly 204. In one example, the arm pivot mounts 352 may include clevis features. For instance, the arm pivot mounts 352 may each have a recessed area that receives a respective second end of the lift arms 310A-311B and that receives a bolt, or pin, that engages with the respective second end of the lift arms 310A-311B and arm pivot mount 352. The lift arms 310A-311B may then be pivotally mounted to the blade assembly 204 via the bolted, or pinned, clevis mount at each arm pivot mounts 352. In some embodiments, the arm pivot mounts 352 of the inner lift arms 310A-310B may be disposed above (e.g., measured in the Y-axis direction) the arm pivot mounts 352 of the outer lift arms 311A-311B, or vice versa. This arrangement may allow the blade mount and actuator assembly 300 to move as a four-bar linkage and, when the debris clearing device 110 is actuated, may translate the blade assembly 204 along a defined path. In some cases, this translation may be linear (e.g., along the Y-axis direction, etc.).

In some embodiments, the debris clearing device 110 may be lowered from the retracted position into the deployed position (e.g., the extended state of the roadway debris clearing system 100') via the lift actuator 304. The lift actuator 304 may correspond to any actuation device, or mechanism, that selectively moves between a retracted position and an extended position. Examples of the lift actuator 304 may correspond to a motor and chain assembly (e.g., described in greater detail with respect to FIGS. 5A-5B), a fluid cylinder (e.g., a pneumatic cylinder, a hydraulic cylinder, and/or combinations thereof), screw actuator, a linear actuator (e.g., screw type actuator with electric motor, solenoid actuator, etc.), and/or other mechanism that, when actuated (e.g., via electrical control, pneumatic control, hydraulic control, etc., and/or combinations thereof), produces movement along a straight line at least between a first position and a second position (e.g., the stroke length of the lift actuator 304). A first end of the lift actuator 304 may be attached to a portion of the vehicle frame 302, a static (e.g., fixedly attached) frame attached to the vehicle frame 302, and/or some other rigid portion of the vehicle 104. The second end of the lift actuator 304 may be attached to an arm pivot mount 352 (e.g., that serves as an actuator mount) that is attached to the lower portion 350 of the blade assembly 204. In some embodiments, the arm pivot mount 352 serving as the actuator mount may comprise a recess that receives at least a portion of the second end of the lift actuator 304. As the lift actuator 304 extends, the distance between the first and second ends of the lift actuator 304 increases and as the lift actuator 304 retracts, the distance between the first and second ends of the lift actuator 304 decreases. Because the first end of the lift actuator 304 may be attached to an unmoving portion of the vehicle 104 (e.g., the vehicle frame 302, etc.), the actuation of the lift actuator 304 causes the blade assembly 204 to translate, or move, relative to the vehicle frame 302 (e.g., from the retracted position to the extended position, and/or vice versa). The lift actuator 304 is shown in an extended state in FIG. 3B.

The lift actuator 304 may be controlled by a fluid control circuit, pneumatic control switch, hydraulic control switch, an actuation control switch, and/or in response to a signal received from an actuation controller. In one embodiment, where the lift actuator 304 is a hydraulic and/or pneumatic cylinder, a switch may control the flow of a fluid (e.g., oil, air, gas, etc.) to the lift actuator 304 to actuate the cylinder. For example, to extend the cylinder, the switch may be moved from a first position to a second position causing the fluid to enter a first port of the cylinder and push a rod of the cylinder in an extending (e.g., outwardly or lengthening) direction. Continuing this example, to retract the cylinder, the switch may be moved from the second position to the first position, or a third position, causing the fluid to enter a second port of the cylinder and push the rod of the cylinder in a retracting (e.g., collapsing or shortening) direction retracting the cylinder. In some embodiments, the lift actuator 304 may be actuated by an actuation controller. The actuation controller may correspond to any computer or other processor and memory and that is capable of receiving electrical input and producing an electrical output. Examples of the actuation controller may include, but is in no way limited to, one or more Programmable Logic Controllers ("PLCs"), single-board microcontrollers (e.g., Arduino®, Raspberry Pi, etc.), and/or the like.

In some embodiments, the blade assembly 204 may comprise an upper lateral support angle 344 that is attached to the rear of the blade assembly 204 at an upper portion 340 thereof. The upper lateral support angle 344 may provide additional lateral stability (e.g., along the X-axis) of the blade assembly 204. In some embodiments, the upper lateral support angle 344 may be used to attach one or more components of the debris clearing device 110 described herein. In one embodiment, the blade assembly 204 may comprise a lower lateral support angle 348 that is attached to the rear of the blade assembly 204 at lower portion 350 thereof. The lower lateral support angle 348 may provide additional lateral stability (e.g., along the X-axis), and/or a resistance to bending of the angled blade portions 212A-212B relative to the front blade portion 208 of the blade assembly 204. In some embodiments, the lower lateral support angle 348 may be used to attach one or more components of the debris clearing device 110 described herein. In one embodiment, the upper lateral support angle 344 and/or the lower lateral support angle 348 may be made from steel angle that is welded or fastened to the rear of the blade assembly 204 (shown in FIG. 3B).

Figure 3C:
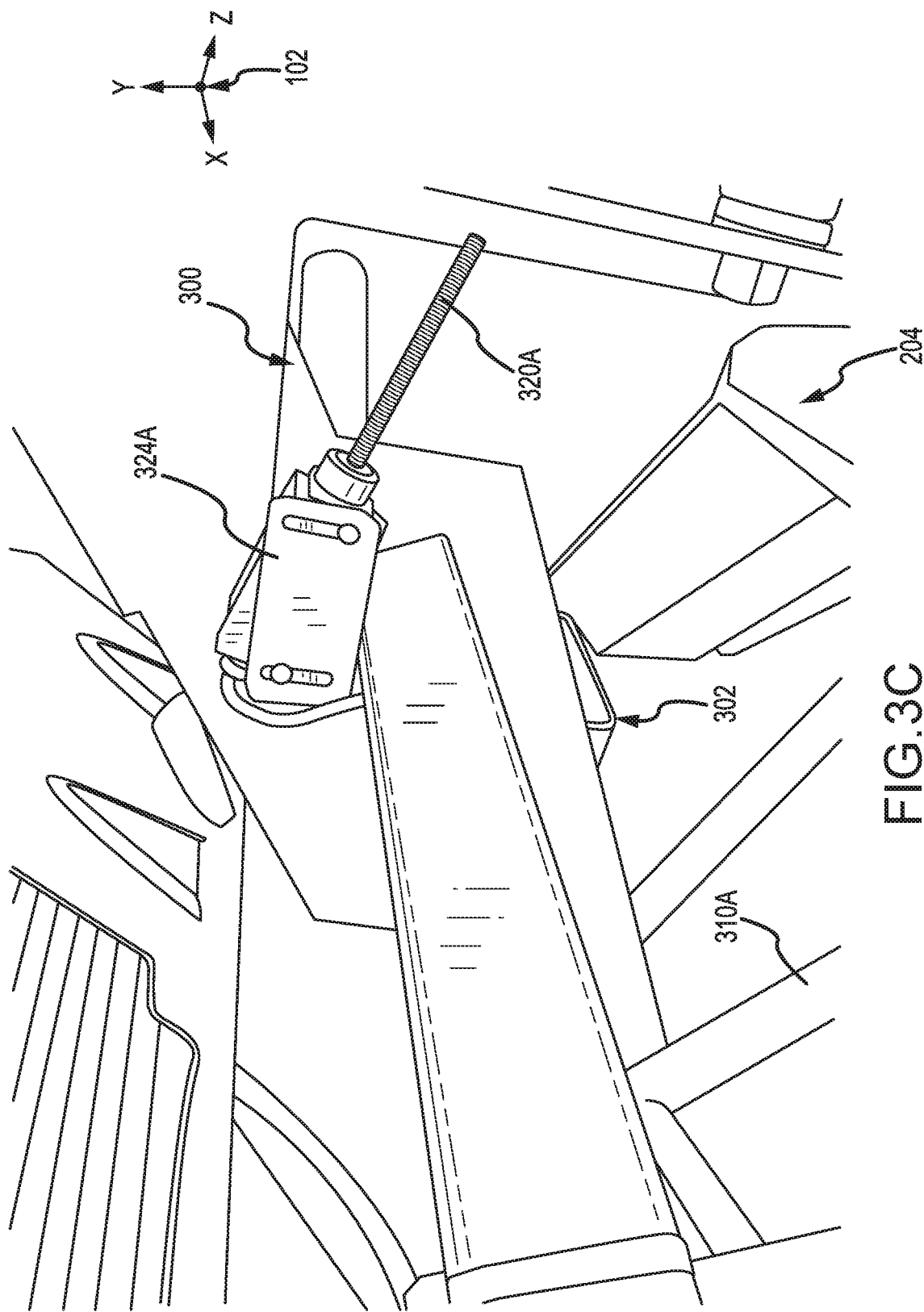
FIG. 3C is a third perspective detail view of the blade mount and actuator assembly of the roadway debris clearing system in accordance with embodiments of the present disclosure.

Referring now to FIG. 3C, the blade mount and actuator assembly 300 of the debris clearing device 110 may comprise one or more limit switch mounts 324A-324B, limit switches 320A-320B, catches 328, etc. The views illustrated in FIGS. 3C-3G may correspond to various detail views of a space between the front bumper 108 and the engine, or frame, (e.g., at a rear of the of debris clearing device 110) of the vehicle 104, as viewed from arrow 3C illustrated in FIG. 2B. When the lift actuator 304 is actuated, the debris clearing device 110 may be lowered from a retracted position into a deployed, or extended, position. As the debris clearing device 110 moves from the retracted position to the deployed position, a catch 328 may engage with a lower limit switch 320B (shown in FIG. 5B). Each of the limit switches 320A-320B described herein may include a lever arm that contacts a portion of the debris clearing device 110 when in a retracted position and when in the deployed position. The lower limit switch 320B may be attached to the mount frame and/or the vehicle frame 302 via a lower limit switch mount 324B (e.g., a mount plate). As the catch 328 engages with the lever arm and moves the lower limit switch 320B from a first position to a switched second position, the lower limit switch 320B may send a switch signal to the actuation controller. In one embodiment, where the lift actuator 304 is controlled by the actuation controller, the switch signal may cause the actuation controller to cease the actuation signal of the lift actuator 304. In some embodiments, the switch signal may be received by a processor of the roadway debris clearing system 100. In response to receiving the switch signal indicating the blade assembly 204 of the debris clearing device 110 is in the lowered, deployed position, the processor may cause images from at least one camera (e.g., video camera, etc.) of the roadway debris clearing system 100 to be rendered to a display device associated with the roadway debris clearing system 100.

When the lift actuator 304 is actuated in an opposite second direction, the debris clearing device 110 may be raised from a deployed position into a retracted position. As the debris clearing device 110 moves from the deployed position to the retracted position, a portion of the debris clearing device 110 and/or another catch may engage with a lever arm of an upper limit switch 320A. The upper limit switch 320A may be attached to the mount frame and/or the vehicle frame 302 via an upper limit switch mount 324A (e.g., a mount plate). As the lever arm moves, the upper limit switch 320A moves from a first position to a switched second position. In one embodiment, where the lift actuator 304 is controlled by the actuation controller, this retracted switch signal may cause the actuation controller to cease the actuation signal of the lift actuator 304. In some embodiments, the retracted switch signal may be received by the processor of the roadway debris clearing system 100. In response to receiving the retracted switch signal indicating the blade assembly 204 of the debris clearing device 110 is in the upper, retracted position, the processor may cause images from at least one camera of the roadway debris clearing system 100 to be rendered, or ceased from being rendered, to a display device associated with the roadway debris clearing system 100.

In some embodiments, the blade mount and actuator assembly 300 may prevent overtravel in a particular direction based on a currently detected state of each limit switch 320A, 320B. For example, if the upper limit switch 320A is "on" and the lower limit switch 320B is "off," the actuation controller knows the debris clearing device 110 is in a fully-retracted position and, as such, prevents any further actuation of the lift actuator 304, for example, in the raising direction. Conversely, if the upper limit switch 320A is "off" and the lower limit switch 320B is "on," the actuation controller knows the debris clearing device 110 is in a fully-deployed, or extended, position and, as such, prevents any further actuation of the lift actuator 304 in the lowering direction. If both limit switches 320A-320B are "off," then the debris clearing device 110 is in a position between the fully-retracted and fully-deployed positions. If both limit switches 320A-320B are "on," then an error with the system has occurred, and a driver or other user of the vehicle 104 may be instructed (e.g., via a display device in the vehicle interior 112 in communication with the actuation controller) to check the roadway debris clearing system 100 for a jam, trapped debris, or other fault condition.

Several safety features may prevent the debris clearing device 110 from moving past a predetermined threshold. In one embodiment, the blade edges 220A-220C may provide a wear surface that the debris clearing device 110 may rest on a roadway surface 120. Additionally or alternatively, the debris clearing device 110 may include one or more blade shoes 334 disposed adjacent to a lowermost edge of the debris clearing device 110. The blade shoes 334 may provide a spring-loaded contact between the debris clearing device 110 and the roadway surface 120. In the retracted state of the debris clearing device 110, for example, shown in FIGS. 3D and 3F, the blade shoes 334 are lifted off, and out of contact with, the roadway surface 120. In the extended state of the roadway debris clearing system 100' where the debris clearing device 110 is in the deployed position, for example, as shown in FIGS. 3E and 3G, the blade shoes 334 may contact the roadway surface 120. In some embodiments, the blade shoes 334 may serve as a running guide for the blade assembly 204 ensuring the blade assembly 204 does not drop lower than a predetermined dimension from the roadway surface 120.

Figure 3D:
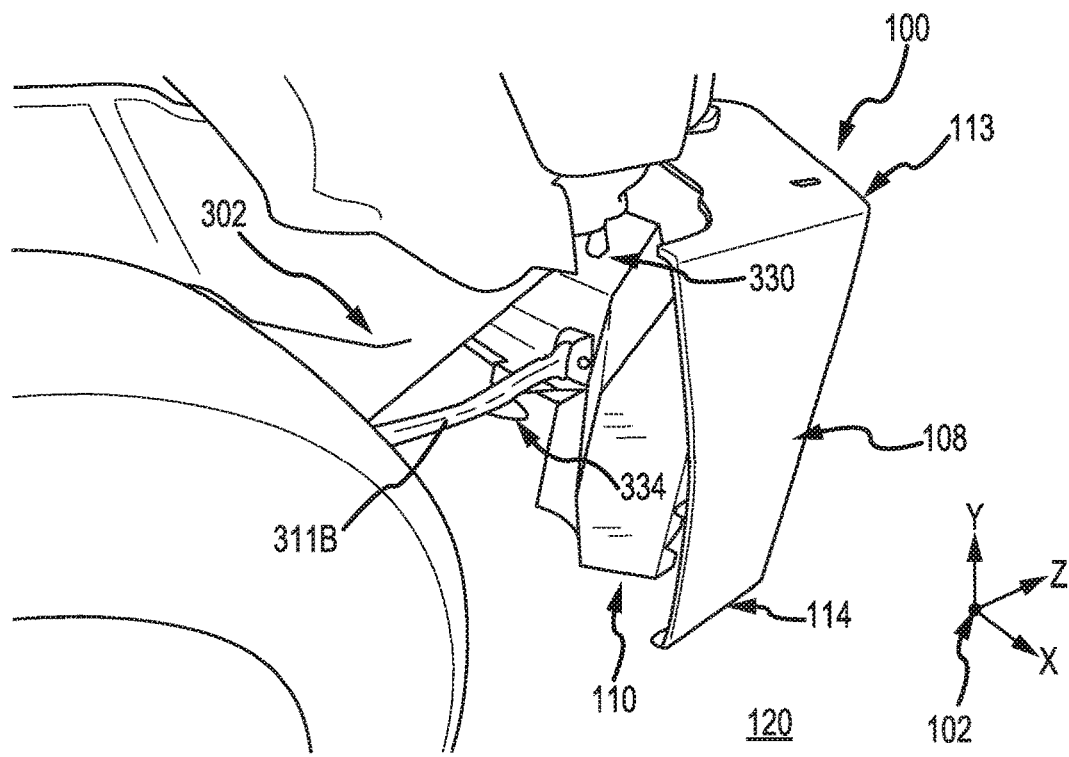
FIG. 3D is a perspective detail view as seen from a side of the vehicle of the debris clearing device and the blade mount and actuator assembly in a retracted state in accordance with embodiments of the present disclosure.
Figure 3E:
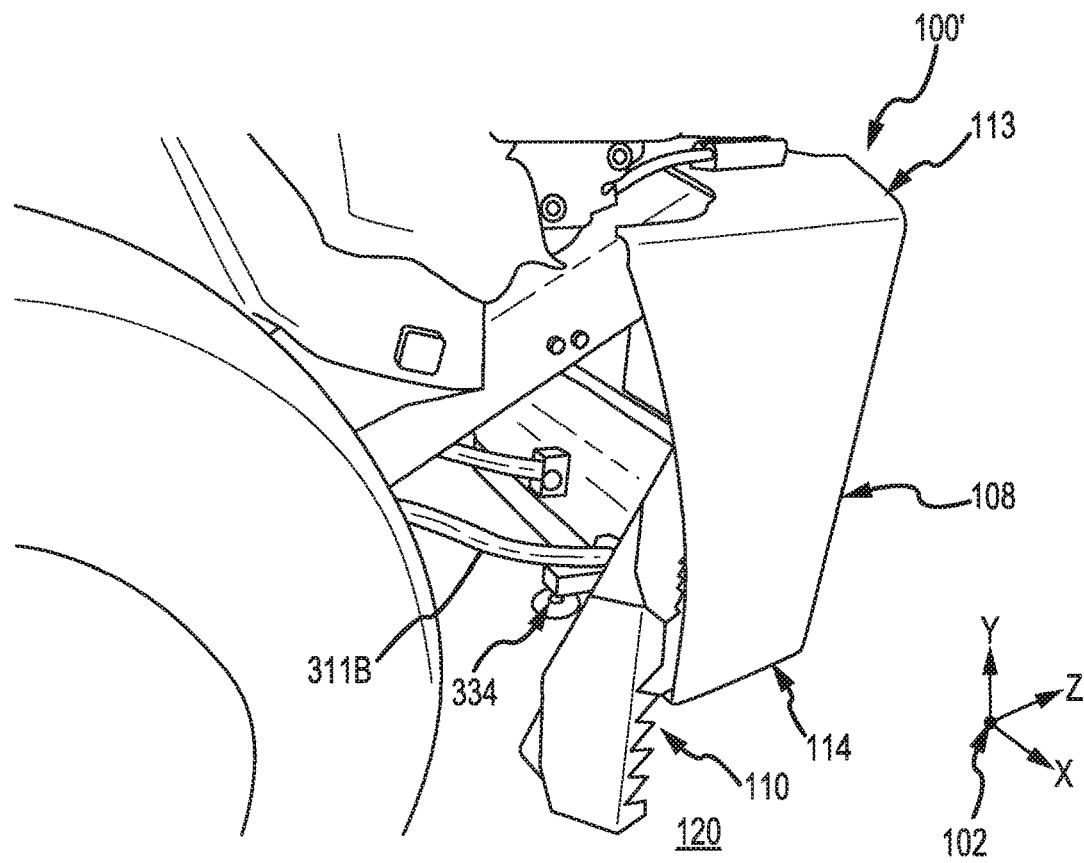
FIG. 3E is a perspective detail view as seen from a side of the vehicle of the debris clearing device and the blade mount and actuator assembly in an extended state in accordance with embodiments of the present disclosure.
Figure 3G:
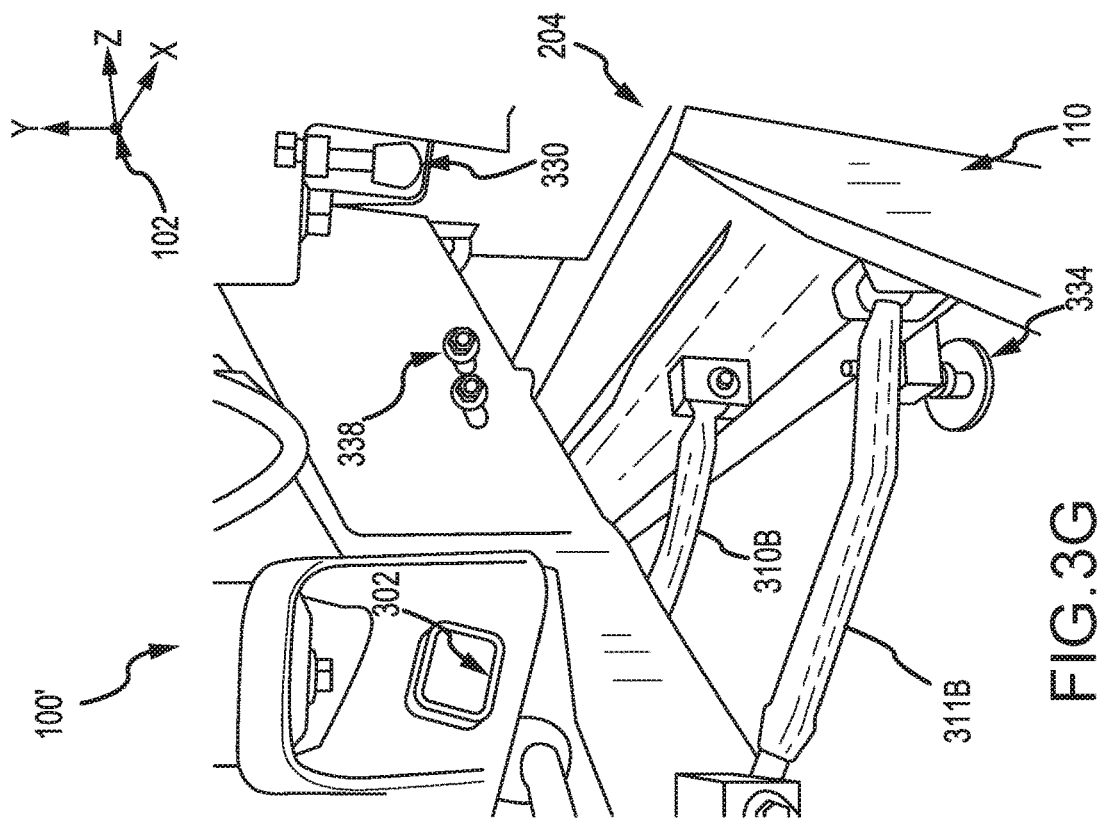
FIG. 3G is a perspective detail view as seen from a side of the vehicle, behind the front bumper, of the lift arms of the debris clearing device in an extended state in accordance with embodiments of the present disclosure.
Figure 3F:
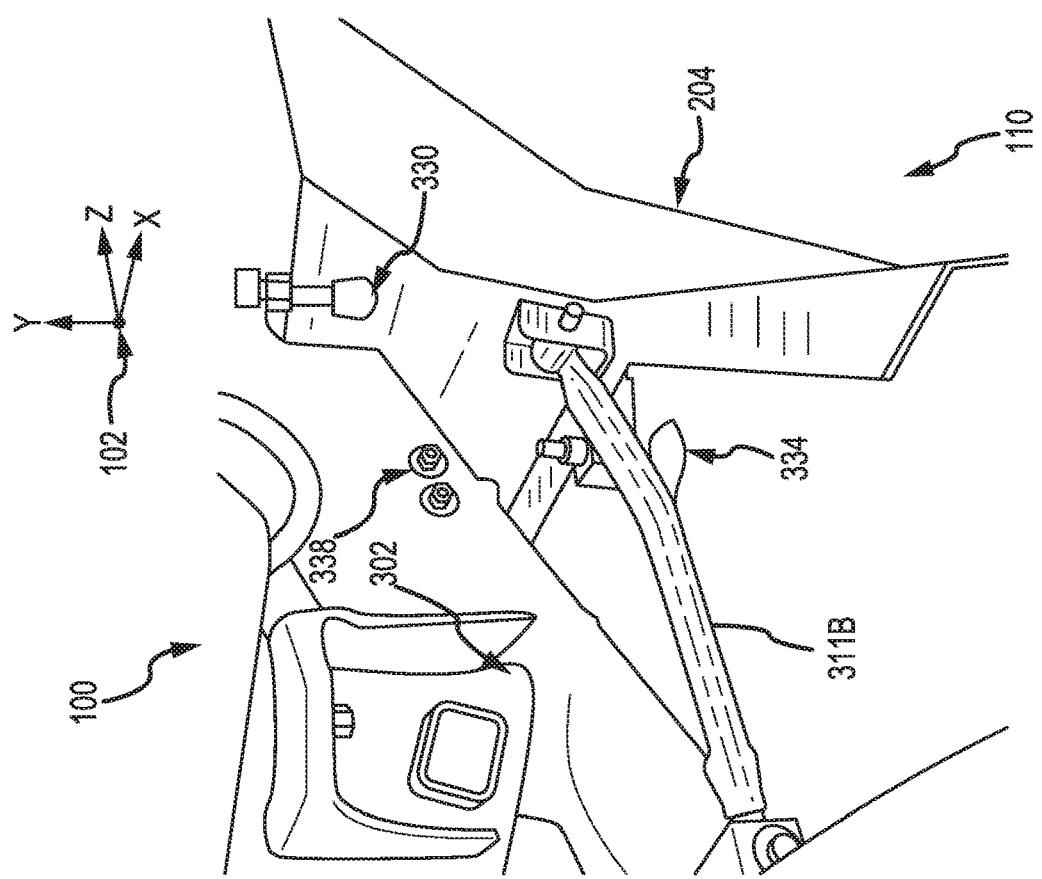
FIG. 3F is a perspective detail view as seen from a side of the vehicle, behind the front bumper, of the lift arms of the debris clearing device in a retracted state in accordance with embodiments of the present disclosure.

When in the retracted position (e.g., as shown in FIGS. 3D and 3F), the debris clearing device 110 may be prevented from vibrating, or moving, behind the front push bumper 108 by at least one vibration isolator 330. The vibration isolator 330 may be mounted to a portion of the front push bumper 108, the vehicle frame 302, and/or the mount frame of the blade mount and actuator assembly 300. As shown in FIGS. 3D and 3F-3G, the vibration isolator 330 may comprise an adjustable (e.g., threaded) rod disposed in a portion (e.g., hole) of the mount frame and/or front push bumper 108. The vibration isolator 330 may comprise a rubber or compliant member that contacts a surface of the debris clearing device 110 when in the retracted position. For instance, as the debris clearing device 110 retracts, the compliant member of the vibration isolator 330 may compress providing a shock absorbing contact between the debris clearing device 110 and the front push bumper 108 or mount frame of the blade mount and actuator assembly 300 attached to the vehicle 104. In some embodiments, the vibration isolator 330 may correspond to a spring-loaded shock absorber, adjustable shock absorber, industrial shock absorber, hydraulic shock absorber, compliant cushion, inline skate wheel, etc., and/or combinations thereof.

FIGS. 4A-4D show various views of the imaging and control elements of the roadway debris clearing system 100 in accordance with embodiments of the present disclosure. The imaging and control elements may comprise a leading view camera 404, a focused view camera 408, a display device 412, and one or more control switches 416.

Figure 4B:
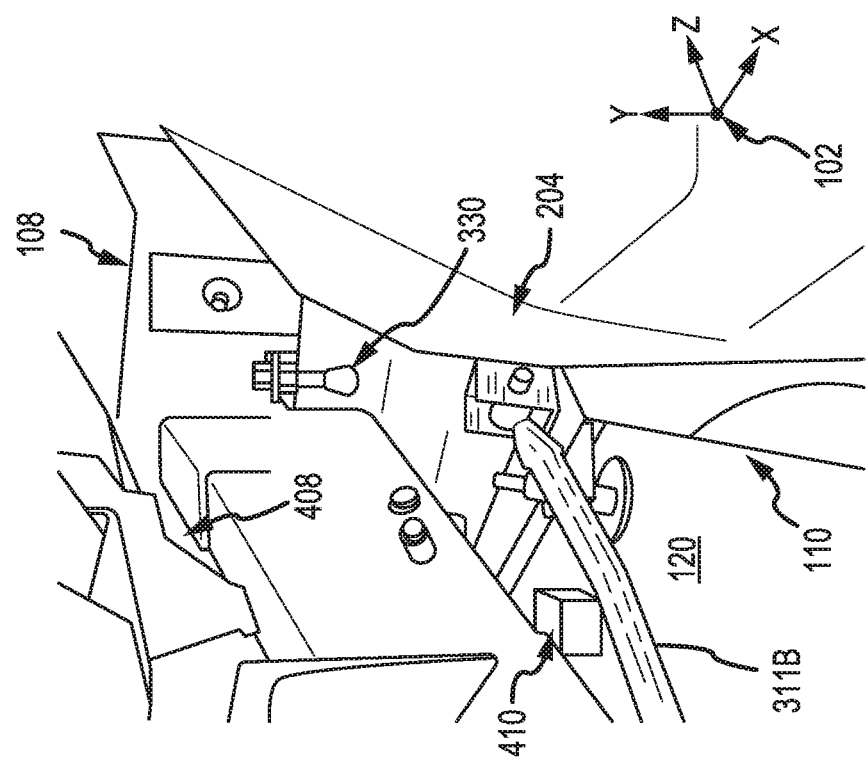
FIG. 4B is a perspective detail view as seen from a side of the vehicle, behind the front bumper, of the imaging and control elements of the roadway debris clearing system in accordance with embodiments of the present disclosure.
Figure 4A:
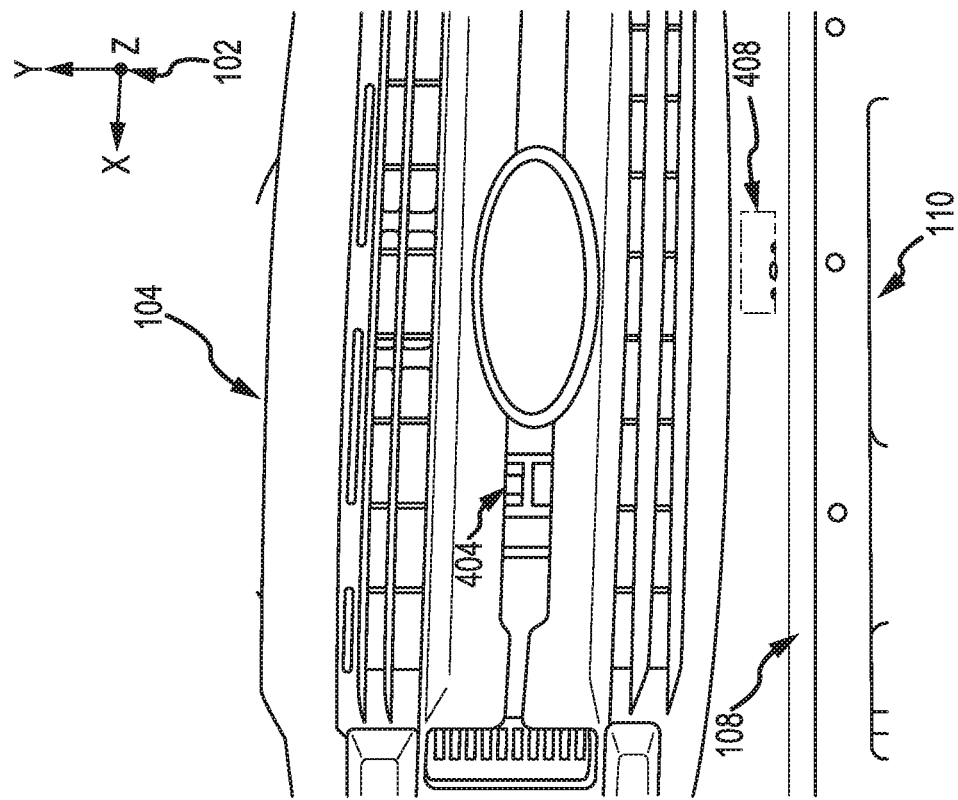
FIG. 4A is a front elevation detail view of the imaging and control elements of the roadway debris clearing system in accordance with embodiments of the present disclosure.

Referring now to FIG. 4A, a front elevation detail view of the imaging and control elements of the roadway debris clearing system 100 is shown in accordance with embodiments of the present disclosure. The roadway debris clearing system 100 may comprise a leading view camera 404 that is disposed in the grill, or at some front portion, of the vehicle 104. The leading view camera 404 may be angled to view an area of the roadway surface 120 in front of the vehicle 104. In some embodiments, the roadway debris clearing system 100 may comprise a focused view camera 408 that is disposed behind the front push bumper 108 and configured to view a portion of the debris clearing device 110 when the debris clearing device 110 is deployed in the extended and operational position. The leading view camera 404 and/or the focused view camera 408 may each comprise one or more image sensors, lenses, lighting elements (e.g., infrared lights, light emitting diodes, etc.) that captures and records still and/or moving images in one or more viewing areas in front of the vehicle 104.

FIG. 4B shows a perspective detail view as seen from a side of the vehicle, behind the front bumper, of the imaging and control elements of the roadway debris clearing system 100 and an example imaging scene in accordance with embodiments of the present disclosure. In FIG. 4B, an object 410 is positioned under the front push bumper 108, and in front of the debris clearing device 110. The object 410 may correspond to any debris or other object that may be found on the roadway surface 120. Viewing of this object 410 will be described in conjunction with FIG. 4D.

Figure 4C:
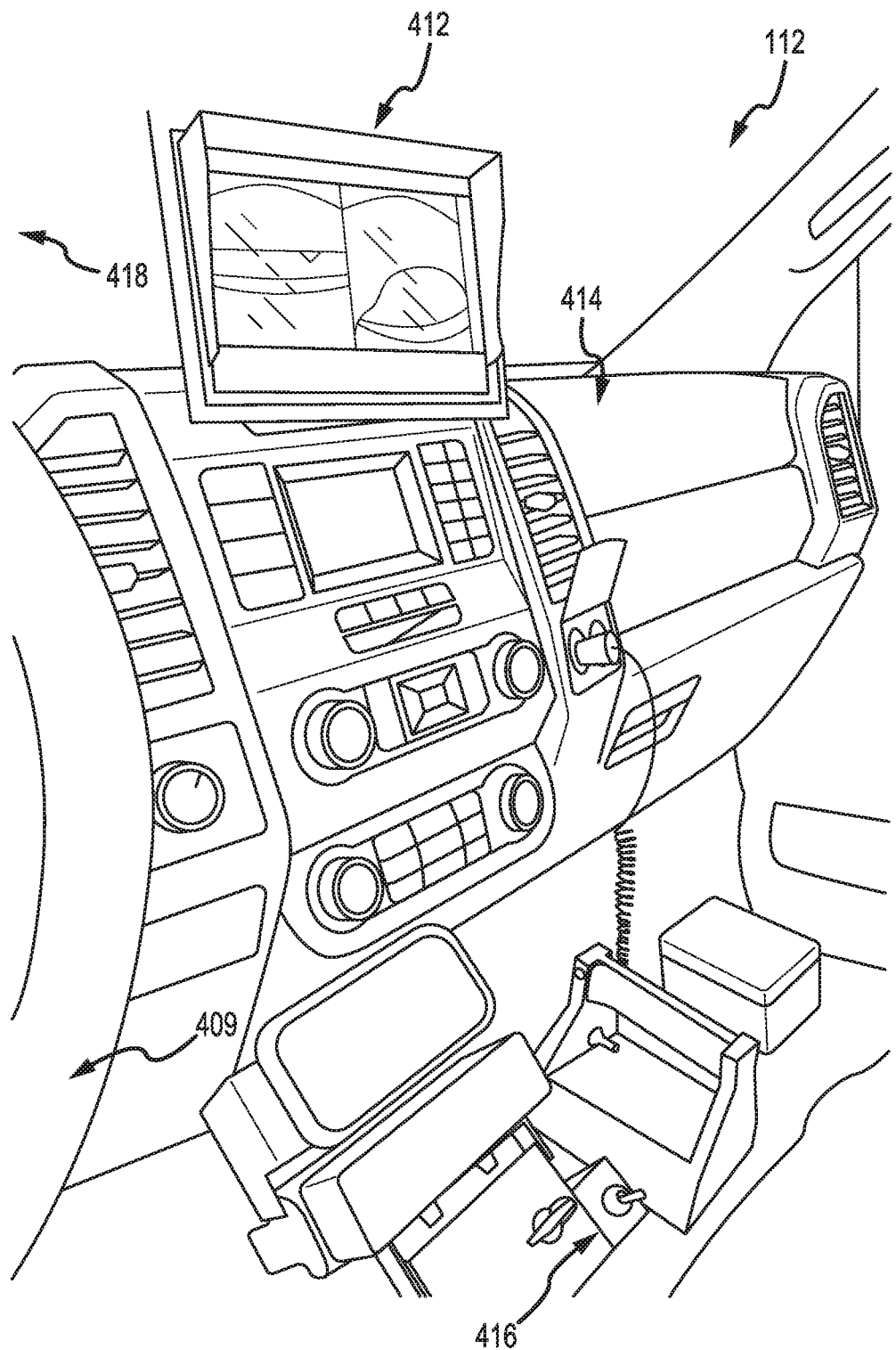
FIG. 4C is a perspective detail view of the vehicle interior including a display device and control elements for the roadway debris clearing system in accordance with embodiments of the present disclosure.

FIG. 4C is a perspective detail view of the vehicle interior 112 including a display device 412 and control switches 416 for the roadway debris clearing system 100 in accordance with embodiments of the present disclosure. The view of the vehicle interior 112 shown in FIG. 4C may correspond to the view of a driver of the vehicle 104. The driver may be able to steer the vehicle 104 via a steering wheel 409, while viewing the display device 412 simultaneously with the roadway sight area 418. In some embodiments, the display device 412 may be mounted above the dashboard 414 of the vehicle 104 to allow the driver to see both the roadway surface 120 and the screen of display device 412. The control switch 416 may operate between a first position corresponding to a retracted position of the debris clearing device 110 and a second position corresponding to a deployed, or extended, position of the debris clearing device 110. In some embodiments, the control switch 416 may be a mechanical toggle switch or the like.

Figure 4D:
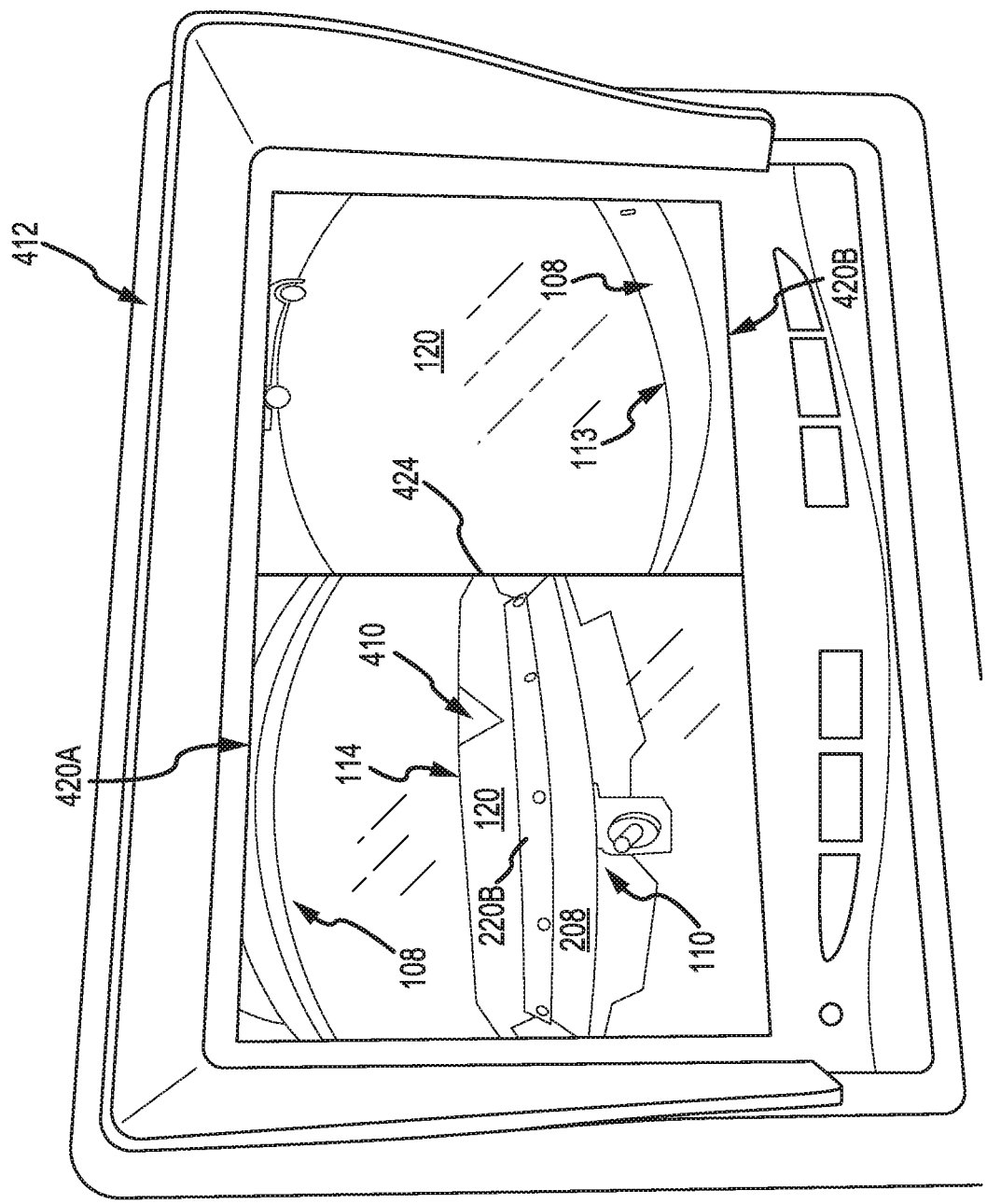
FIG. 4D is a representative image of a screen of the roadway debris clearing system showing images rendered from multiple cameras of the system in accordance with embodiments of the present disclosure.

FIG. 4D shows a detail perspective view of the display device 412 shown and described in conjunction with FIG. 4C. As described above, FIG. 4D shows a representative image of a screen of the display device 412 including images rendered from multiple cameras 404, 408 of the system 100' in accordance with embodiments of the present disclosure. In particular, as the debris clearing device 110 is lowered from the retracted position, the display device 412 may render information (e.g., images) collected by the leading view camera 404 and the focused view camera 408. In some embodiments, the images may be rendered to the screen of the display device 412 simultaneously. Among other things, this simultaneous presentation of images allows a driver of the vehicle 104 to observe oncoming debris ahead of the vehicle 104 and debris that is being pushed by the debris clearing device 110.

The display device 412 in FIG. 4D is shown separated into a first screen portion 420A and a second screen portion 420B by a partition line 424. Although shown side-by-side, it should be appreciated that the first screen portion 420A may be disposed above, or below, the second screen portion 420B, and/or within an area of the second screen portion 420B (e.g., picture-in-picture, etc.), and/or vice versa. In some embodiments, the first screen portion 420A may correspond a close-up view under the vehicle 104 including images rendered from the focused view camera 408. For instance, the close-up view shown in the first screen portion 420A may represent a camera angle (e.g., for the focused view camera 408) that is directed toward the roadway surface 120 in a space between the inside of the front push bumper 108 and the front of the front blade portion 208, etc. This close-up view allows debris to be viewed relative to at least one edge (e.g., second blade edge 220B) or portion of the extended debris clearing device 110. In the first screen portion 420A, the object 410 is shown under the lower edge 114 of the front push bumper 108 lying on the roadway surface 120 about to contact the second blade edge 220B of the blade assembly 204. As shown in FIG. 4D, the object 410 (e.g., described in conjunction with the imaging scene of FIG. 4B) is visible in the first screen portion 420A but not in the second screen portion 420B. The second screen portion 420B may correspond to a front of vehicle 106 view including images rendered from the leading view camera 404 (e.g., showing an area ahead of the vehicle 104, etc.). The leading view camera 404 may be disposed at angle toward the front of the vehicle 104 toward the roadway surface 120 and, in some cases, may be disposed above the upper edge 113 of the front push bumper 108 of the vehicle 104. The leading view camera 404 may provide a wide view of the area around the front of the vehicle 104. As shown in FIG. 4D, another vehicle is shown on the roadway surface 120 ahead of the vehicle 104. It is an aspect of the present disclosure that the multiple cameras allow the driver of the vehicle 104 to target debris on the roadway surface 120 while driving (e.g., via the leading view camera 404 and corresponding images rendered to the second screen portion 420B, etc.), confirm that the debris is in contact with the deployed debris clearing device 110 (e.g., via the focused view camera 408 and corresponding images rendered to the first screen portion 420A, etc.), and check for any issues (e.g., blockages, jams, lodged debris, etc.) under the front push bumper 108 without requiring additional personnel. Among other things, this multiple-camera approach allows a driver to remain safely inside the vehicle 104 while clearing debris using the debris clearing device 110. Further, the position of the display device 412 in the driver's line of sight of the roadway surface 120 allows the driver to safely operate the vehicle while still being able to pay attention to the surrounding environment of the vehicle 104.

The display device 412 and the images rendered to the screen of the display device 412 may be controlled by the actuation controller, computer, or some other processor of the roadway debris clearing system 100.

Figure 5B:
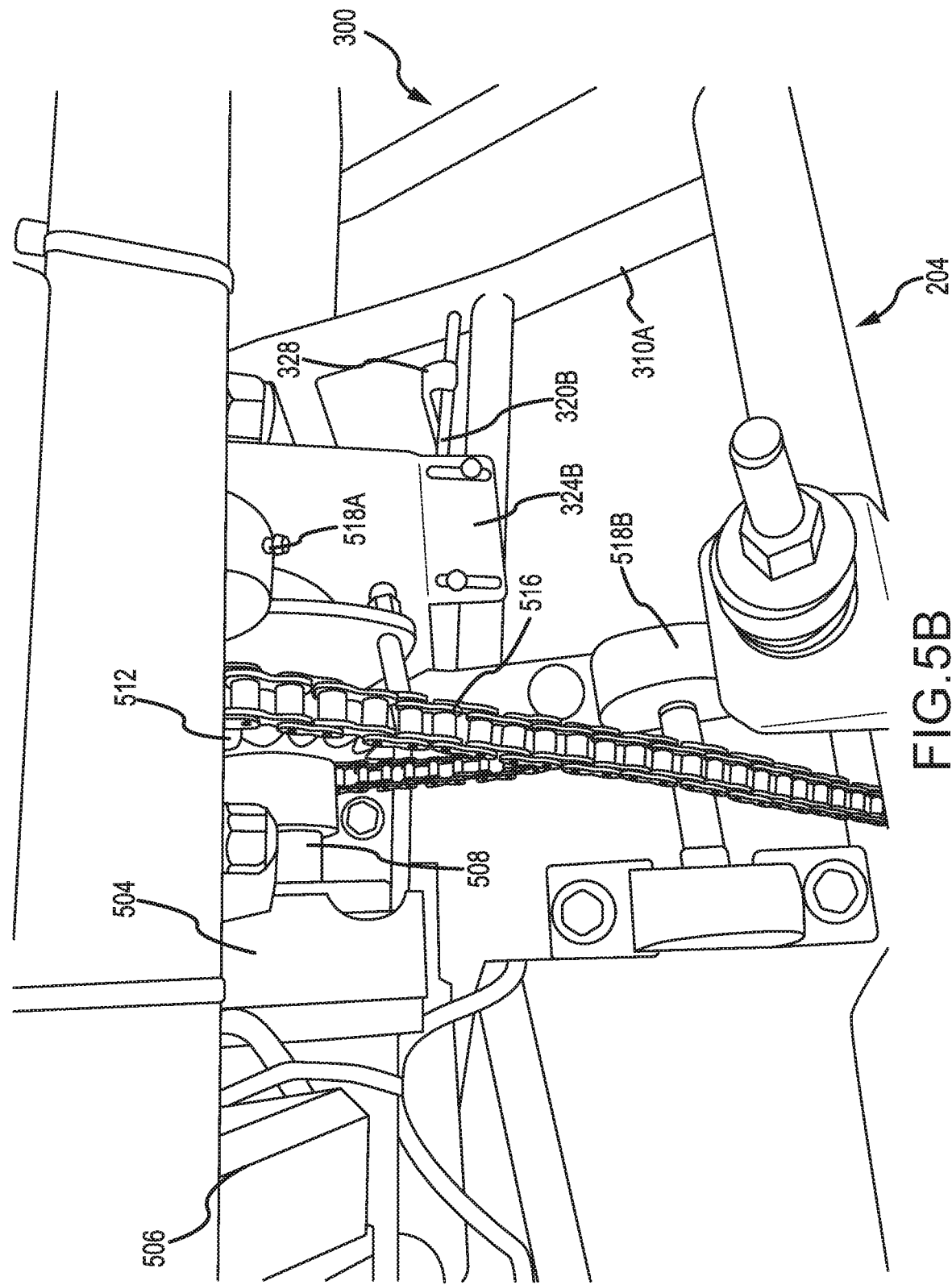
FIG. 5B is a second perspective detail view of the motor-driven lift actuator of the blade mount and actuator assembly of the roadway debris clearing system in accordance with embodiments of the present disclosure.

In some embodiments, and referring to FIGS. 5A-5B, the blade assembly 204 may be lifted via a motor-driven lift actuator in place of, or in conjunction with, a fluid-actuated (e.g., pneumatic and/or hydraulic) lift actuator (e.g., cylinder, etc.). In this example, the blade mount and actuator assembly 300 of the debris clearing device 110 may comprise one or more bearing assemblies 318A-318B, limit switch mounts 324A-324B, catches 328, etc. For instance, the lift actuator 304 of the blade mount and actuator assembly 300 may be a blade lift drive motor 504 that, in response to receiving a drive command from a drive motor controller 506, turns a drive shaft 508 and drive gear 512 that engage with a blade lift chain 516. In one embodiment, the blade lift drive motor 504 may correspond to a winch motor.

When the blade lift drive motor 504 turns in a first direction, the debris clearing device 110 may be lowered from a retracted position into a deployed, or extended, position. As the debris clearing device 110 moves from the retracted position to the deployed position, a catch 328 engages with a lower limit switch 320B (e.g., a lever arm of a limit switch). The lower limit switch 320B may be attached to the mount frame and/or the vehicle frame 302 via a lower limit switch mount 324B (e.g., a mount plate). As the catch 328 engages with the lever arm and moves the lower limit switch 320B from a first position to a switched second position, the drive motor controller 506 operatively connected to the lower limit switch 320B receives the switch signal and ceases the drive command to the blade lift drive motor 504.

When the blade lift drive motor 504 turns in an opposite second direction, the debris clearing device 110 may be raised from a deployed position into a retracted position. As the debris clearing device 110 moves from the deployed position to the retracted position, a portion of the debris clearing device 110 and/or another catch may engage with a lever arm of an upper limit switch 320A. The upper limit switch 320A may be attached to the mount frame and/or the vehicle frame 302 via an upper limit switch mount 324A (e.g., a mount plate). As the lever arm moves, the upper limit switch 320A moves from a first position to a switched second position. In response, the drive motor controller 506 operatively connected to the upper limit switch 320A receives the switch signal and ceases the drive command to the blade lift drive motor 504, maintaining the debris clearing device 110 in the retracted position. In some embodiments, the blade mount and actuator assembly 300 may prevent overtravel in a particular direction based on a currently detected state of each limit switch 320A, 320B. For example, and as described above, if the upper limit switch 320A is "on" and the lower limit switch 320B is "off," the drive motor controller 506 knows the debris clearing device 110 is in the fully-retracted position and, as such, prevents any further actuation of the blade lift drive motor 504 in the raising direction. Conversely, if the upper limit switch 320A is "off" and the lower limit switch 320B is "on," the drive motor controller 506 knows the debris clearing device 110 is in the fully-deployed, or extended, position and, as such, prevents any further actuation of the blade lift drive motor 504 in the lowering direction. If both limit switches 320A-320B are "off," then the debris clearing device 110 is in a position between the fully-retracted and fully-deployed positions. If both limit switches 320A-320B are "on," then an error with the system has occurred, and a driver or other user of the vehicle 104 may be instructed (e.g., via a display device in the vehicle interior 112 in communication with the drive motor controller 506) to check the roadway debris clearing system 100 for a jam, trapped debris, or other fault condition.

Figure 6:
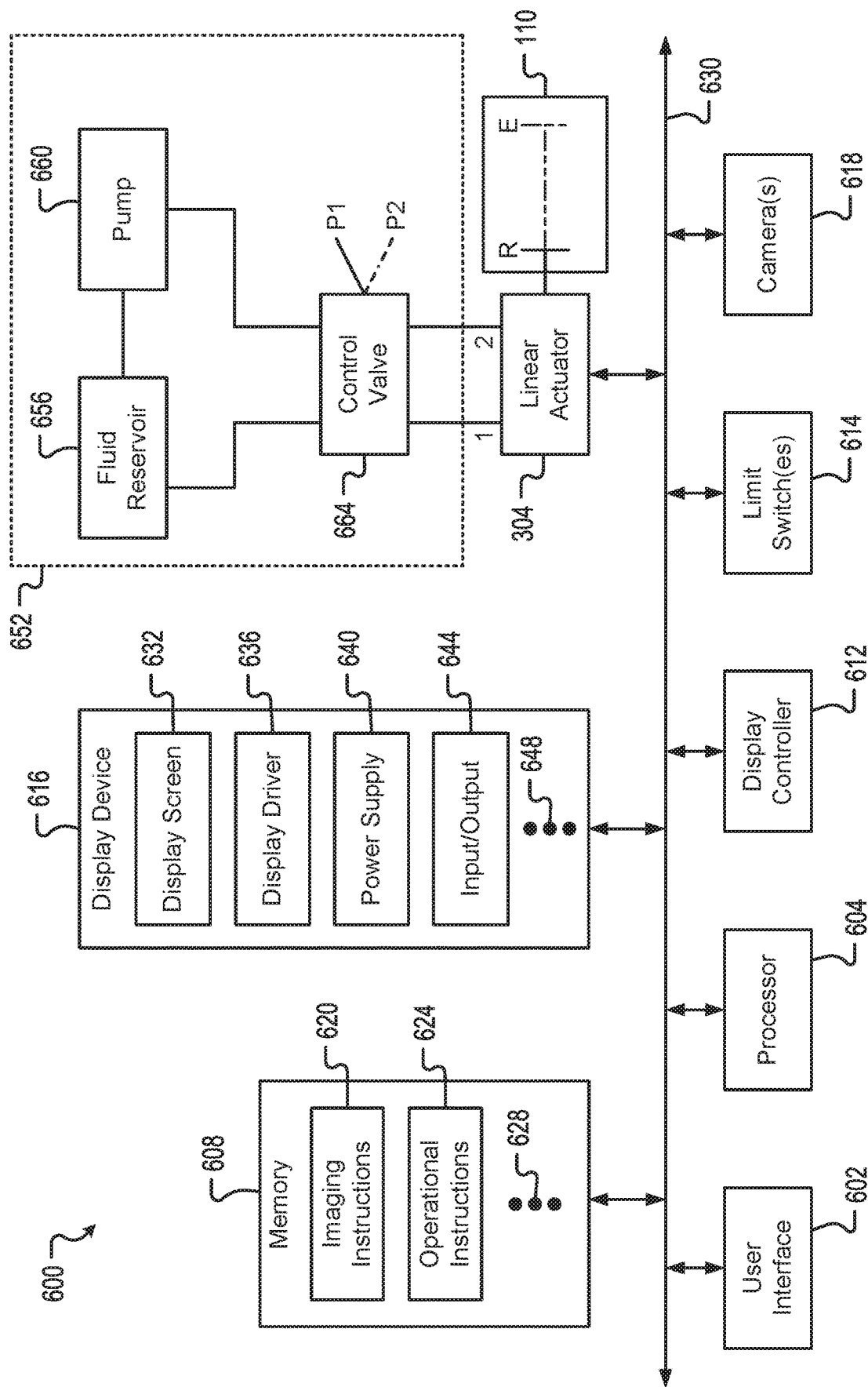
FIG. 6 is a block diagram of a control system of the roadway debris clearing system in accordance with embodiments of the present disclosure.

FIG. 6 is a block diagram of a control system 600 of the roadway debris clearing system 100 in accordance with embodiments of the present disclosure. The control system 600 may comprise a user interface 602, one or more processors 604, a display controller 612, limit switches 614, cameras 618, a memory 608, a linear actuator 304, and/or other components that may all be connected to one another via a power and/or a communications bus 630. In some embodiments, a single computer or controller may comprise the processor 604, the memory 608, and/or one or more other components shown in FIG. 6.

The user interface 602 may correspond to any type of input and/or output device, or combination thereof, that enables a user (e.g., a driver of the vehicle 104, etc.) to interact with the control system 600. Examples of the user interface 602 may include, but are in no way limited to, user interface hardware and devices such as at least one touch-sensitive display elements, buttons, switches, keyboards, peripheral interface devices (e.g., mice, controllers, joysticks, etc.) and/or the like. It is an aspect of the present disclosure that one or more devices in the user interface 602 may provide an input that is interpreted by the processor 604 in controlling one or more components of the roadway debris clearing system 100. In one embodiment, input provided via the user interface 602 may serve as an input that controls a movement of a lift actuator 304. In some embodiments, input provided via the user interface 602 may serve as an input that controls information rendered to the display device 616.

The processor 604 may correspond to one or many computer processing devices. Non-limiting examples of a processor, as used herein, may include a microprocessor, an IC chip, a General Processing Unit ("GPU"), a Central Processing Unit ("CPU"), or the like. Examples of the processor 604 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM1926EJ-S™ processors, other industry-equivalent processors, and may perform computational functions using any known or future-developed standard, instruction set, libraries, and/or architecture. The processor 604 may be a multipurpose, programmable device that accept digital data as input, processes the digital data according to instructions stored in its internal memory, and provides results as output. The processor 604 may implement sequential digital logic as it has internal memory. As with most microprocessors, the processor 604 may operate on numbers and symbols represented in the binary numeral system.

The memory 608 may correspond to any type of non-transitory computer-readable medium. In some embodiments, the memory 608 may comprise volatile or non-volatile memory and a controller for the same. Non-limiting examples of memory 608 that may be utilized in the control system 600 may include RAM, ROM, buffer memory, flash memory, solid-state memory, and/or variants thereof. Any of these memory types may be considered non-transitory computer memory devices even though the data stored thereby can be changed one or more times. In some embodiments, the memory 508 may be configured to store rules and/or the instruction sets depicted in addition to temporarily storing data for the processor 604 to execute various types of routines or functions. The computer memory 608 may store the imaging instructions 620, the operational instructions 624, and/or more 628.

The imaging instructions 620, when executed by the processor 604, may enable the display device 616 to display, or otherwise render, images captured and/or recorded by one or more cameras 618 of the roadway debris clearing system 100. In some embodiments, the cameras 618 may comprise the leading view camera 404 and/or the focused view camera 408 described above. In one embodiment, the imaging instructions 620 may receive information about a state of the limit switches 614 (e.g., the limit switches 320A-320B) in determining a presentation of the images captured by the cameras 618 to render to the display device 616. For instance, when the debris clearing device 110 is in the deployed state, unblocked images from the focused view camera 408 may be rendered by the display device 616. In some embodiments, when the debris clearing device 110 is in the retracted state, the images captured by the focused view camera 408 may be prevented from being rendered by the display device 616. Additionally or alternatively, when the debris clearing device 110 is in the deployed state, images captured by the focused view camera 408 may be shown larger on the display screen 632 of the display device 616 than images captured by the leading view camera 404. In some embodiments, when the debris clearing device 110 is in the retracted state, images captured by the leading view camera 404 may be shown larger on the display screen 632 of the display device 616 than images captured by the focused view camera 408. In one embodiment, the images captured by the leading view camera 404 and/or the focused view camera 408 may be simultaneously rendered to the display screen 632 of the display device (e.g., as shown in FIGS. 4C and 4D). The images may be rendered in equally-sized portions or areas of the display screen 632 separated by a partition line 424, etc.

The operational instructions 624, when executed by the processor 604, may perform one or more of the controls and operations associated with the lift actuator 304 and/or the debris clearing device 110 described herein. In some embodiments, the operational instructions 624 may cause the lift actuator 304 to move between a retracted position, R, and an extended position, E. When in the extended position, E, the debris clearing device 110 may be in the deployed position and when in the retracted position, R, the debris clearing device 110 may be in the retracted position, as described herein. In some embodiments, the operational instructions 624 may determine a control output, or actuation signal, for the lift actuator 304 based on a state of the limit switches 614 and/or a last determined position of the debris clearing device 110.

In some embodiments, the roadway debris clearing system 100 may comprise at least one display device 616 that renders information, applications, windows, interactive elements, and/or other visual output to at least one display screen 632. The display device 616 may correspond to the display device 412 as described herein. In some embodiments, a display controller 612 may be a part of the control system 600 that controls an operation of the display device 616. This operation may include the control of input (e.g., input provided by the driver, etc., via the user interface 602, command input via the instruction sets in memory 608, and/or combinations thereof, etc.), output (e.g., display, rendered images, window behavior, etc.) and/or other functions of the display device 616 and a display controller 612.

As described above, the display device 616 may comprise at least one display screen 632 that selectively activates pixels and/or display elements to render one or more applications, windows, controls, interactive elements, icons, characters, images, etc. Examples of the display screen 632 may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments, the display device 616 may be configured to render information in one or more discrete areas (e.g., areas, backgrounds, portions, regions, windows, zones, etc.) of the display screen 632 or superimposed in an area of the display screen 632.

The display device 616 may include a display driver 636, a power supply 640, an input/output 644, and/or other components 648 that enable operation of the display device 616. The display driver 636 may receive commands and/or other data provided by the processor 604 and one or more of the instruction sets in memory 608. In response to receiving the commands, the display driver 640 may generate the driving signals necessary to render the appropriate images to the display screen 632.

The power supply 640 may provide electric power to one or more components of the display device 616. In one embodiment, the power supply 640 may include a transformer and/or other electronics that prevent overloading, condition power signals, and/or provide backup power to the display device 616. The input/output 644 may correspond to one or more connections for receiving or exchanging information and/or video from components of the control system 600 (e.g., the processor 604, cameras 618, etc.). The input/output 644 may comprise a high-definition multimedia interface ("HDMI") input, DisplayPort ("DP") input, Ethernet, composite video, component video, H.264, or some other video connection type.

As described herein, the lift actuator 304 may be controlled via fluid logic, a fluid signal, and/or fluid power circuit 652. In some embodiments, the lift actuator 304 may correspond to a pneumatic and/or a hydraulic cylinder. The fluid may correspond to one or more of an oil, air, gas, hydraulic fluid, pneumatic fluid, etc. The fluid power circuit 652 may comprise a fluid reservoir 656, a pump 660, and a control valve 664 that are interconnected to one another by fluid lines or tubes. In some embodiments, the fluid power circuit 652 may comprise one or more components associated with a fluid power system of the vehicle 104 (e.g., a hydraulic system, an air compressor and/or pneumatic system, etc.). In the fluid power circuit 652, as the control valve 664 is moved from a first position, P1, to a second position, P2, fluid may be pumped from the fluid reservoir into the first port, 1, of the lift actuator 304 extending a piston of the lift actuator 304 from a retracted position, R, to an extended position, E. As fluid is pumped into the first port, 1, fluid on the other side of the piston may be allowed to move (e.g., flow, escape, vent, etc.) through the second port, 2, in a direction from the lift actuator 304 to the control valve 664. This movement of fluid may be restricted or controlled via one or more fluid flow controls disposed between the second port, 2, and the control valve 664. When the control valve 664 is moved from the second position, P2, to the first position, P1, fluid may be pumped from the fluid reservoir into the second port, 2, of the lift actuator 304 retracting the piston of the lift actuator 304 from the extended position, E, to the retracted position, R. As fluid is pumped into the second port, 2, fluid on the other side of the piston may be allowed to move (e.g., flow, escape, vent, etc.) through the first port, 1, in a direction from the lift actuator 304 to the control valve 664. This movement of fluid may be restricted or controlled via one or more fluid flow controls disposed between the first port, 1, and the control valve 664. In some embodiments, the actuation of the pneumatic and/or hydraulic cylinder may be made by an input provided by the user interface 602. In this case, the signal may be interpreted by the processor 604 and an output may be provided to at least one component of the fluid power circuit 652.

The debris clearing device 110 may be moved from a retracted position into a deployed position by extending the lift actuator 304 and/or moved from a deployed position into a retracted position by retracting the lift actuator 304.

Figure 7:
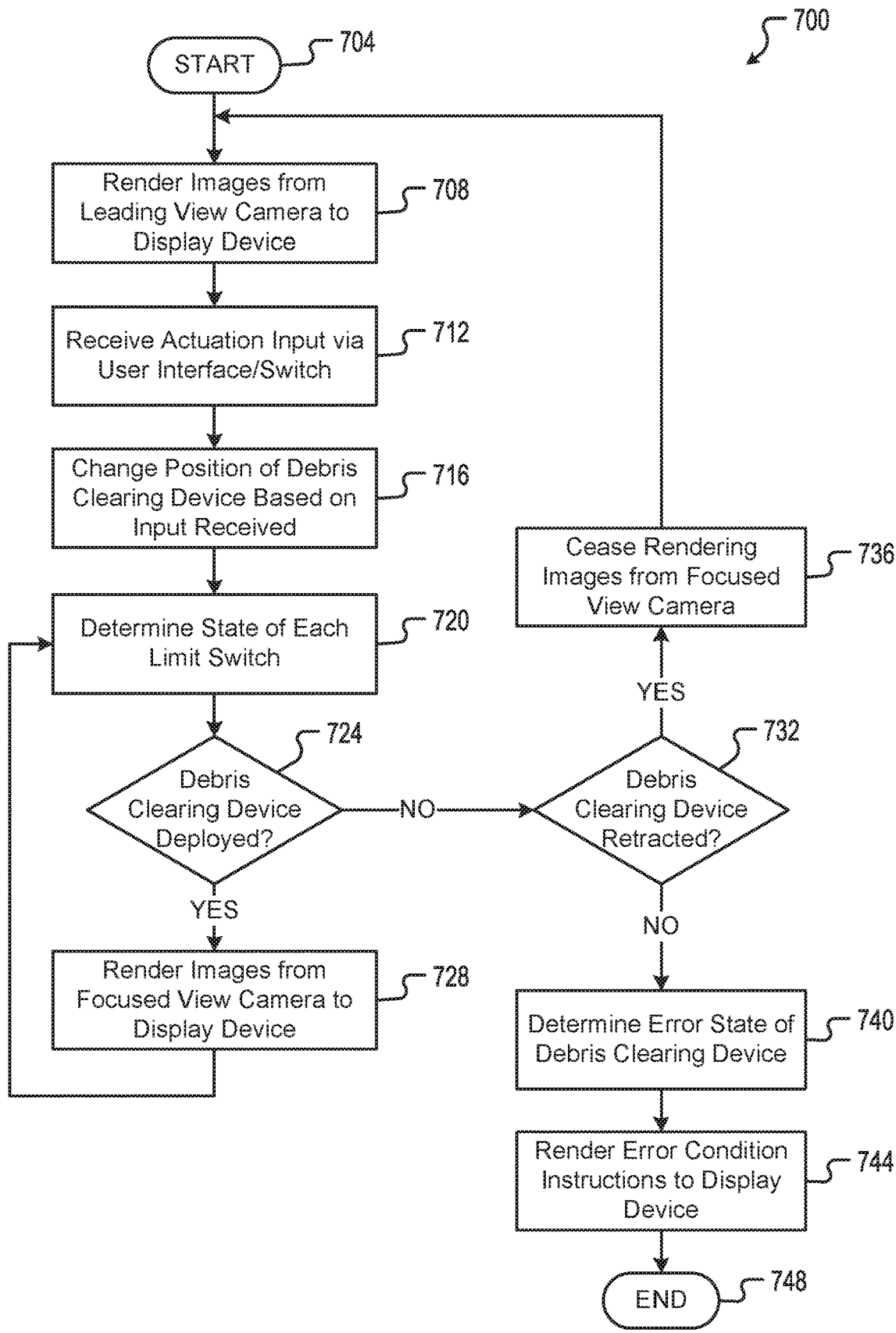
FIG. 7 is a flow diagram depicting a method of operating the debris clearing device in accordance with at least some embodiments of the present disclosure.

FIG. 7 is a flow diagram depicting a method 700 of operating the debris clearing device 100 in accordance with at least some embodiments of the present disclosure. The method 700 can be executed as a set of computer-executable instructions (e.g., imaging instructions 620, operational instructions 624, etc.) executed by a computer system (e.g., the processor 604, etc.) and encoded or stored on a computer readable medium (e.g., the memory 608, etc.). Hereinafter, the method 700 shall be explained with reference to the systems, components, user interfaces, etc. described in conjunction with FIGS. 1A-6.

The method 700 may begin at step 704 and proceed by rendering images from the leading view camera 404 to the display device 412, 616 (step 708). In some embodiments, the images may be live video images captured by the leading view camera 404. The images rendered to the display device 412, 616 by the leading view camera 404 may include an area, or region, in front of the vehicle 104 and the debris clearing device 110 (e.g., in front of the front blade portions 208, 212A-212B of the blade assembly 204. In one embodiment, the images from the leading view camera 404 may be shown along side images from the focused view camera 408.

The method 700 may continue when an actuation input is received from a user (e.g., a driver, etc.) of the vehicle 104 (step 712). The actuation input may be provided via the user interface 602 and/or the control valve 664 switch (e.g., the control switches 416, etc.). In some embodiments, the input may provide an actuation signal that retracts or deploys the debris clearing device 110. In response to receiving the actuation signal, the method 700 may proceed by changing a position of the debris clearing device 110. In some embodiments, a particular position of the control valve 664 or control switch 416 may define a particular position of the debris clearing device 110. For instance, a first position of the control switch 416 may correspond to a retracted position for the debris clearing device 110 while a second position of the control switch 416 may correspond to a deployed position for the debris clearing device 110. In some embodiments, the method 700 may determine to actuate the debris clearing device 110 based on a state of one or more limit switches 320A-320B, 614 in the roadway debris clearing system 100. By way of example, when the actuation input is received and the upper limit switch 320A is "on," the processor 604 may determine that the debris clearing device 110 is in a retracted position. In response, the processor 604 may send a deployment actuation signal to the lift actuator 304 to lower the debris clearing device 110 into the deployed position. Continuing this example, when the actuation input is received and the lower limit switch 320B is "on," the processor 604 may determine that the debris clearing device 110 is in a deployed position. In response, the processor 604 may send a retraction actuation signal to the lift actuator 304 to raise the debris clearing device 110 into the retracted position.

The method 700 may determine the state of each limit switch 320A-320B, 614 in step 720. The state of each limit switch 320A-320B, 614 may serve to determine a particular actuation signal to send to the lift actuator 304 and/or provide safety messaging and/or reporting to a user (e.g., a driver) of the vehicle 104 and/or the roadway debris clearing system 100.

At step 724, the method 700 determines whether the debris clearing device 110 is deployed. This determination is based on information received from one or more of the limit switches 320A-320B, 614. For example, each limit switch 320A-320B, 614 may be in communication with the processor 604 via the bus 630. In some embodiments, each limit switch 320A-320B, 614 may provide a signal to the processor 604 indicative of a position of the limit switch 320A-320B, 614. As provided above, when the lower limit switch 320B is "on" and the upper limit switch 320A is "off" the processor 604 may determine that the debris clearing device 110 is deployed and the method 700 proceeds to step 728. At step 728, the method 700 may determine to render images captured by the focused view camera 408 to the display device 412, 616. These images may provide the user of the roadway debris clearing system 100 with enhanced information in a region directly adjacent to the front blade portions 208, 212A-212B of the blade assembly 204.

When the lower limit switch 320B is not "on" and the upper limit switch 320A is not "off" the processor 604 may determine that the debris clearing device 110 is not deployed and the method 700 may proceed to step 732. In step 732, the method 700 determines whether the debris clearing device 110 is retracted. In particular, when the lower limit switch 320B is "off" and the upper limit switch 320A is "on" the processor 604 may determine that the debris clearing device 110 is retracted and the method 700 may proceed to step 736. At step 736, the method 700 may determine to cease rendering images received from the focused view camera 408. For example, a user of the roadway debris clearing system 100 may wish to see more information from the leading view camera 404 on the display device 412, 616, when the debris clearing device 110 is in the retracted position without additional information from the focused view camera 408. Another benefit of this altered presentation of information may include indicating, at a glance, a state of the debris clearing device 110. For instance, when only information from the leading view camera 404 is shown the single display of information may indicate that the debris clearing device 110 is retracted. The method 700 may return to step 708 and render images from the leading view camera 404.

In some embodiments, the debris clearing device 110 may be neither deployed nor retracted. By way of example, the limit switches 320A-320B, 614 may be both "on," the limit switches 320A-320B, 614 may be both "off," and/or some other fault may be detected by the processor (e.g., no signal is received from at least one of the limit switches 320A-320B, 614, etc.). In this case, the method 700 may continue from step 732 to step 740. At step 740, the processor 604 may determine an error state of the debris clearing device 110. When both of the limit switches 320A-320B, 614 are "on," the error state may be determined to be a blockage or a fault with the limit switches 320A-320B, 614. For example, an object other than the blade assembly 204 may be in contact with one of the limit switches 320A-320B, 614 or one of the limit switches 320A-320B, 614 may be faulty (e.g., bent, broken, etc.). When both of the limit switches 320A-320B, 614 are "off," the error state may be determined to be a jam or a fault with the limit switches 320A-320B, 614. For example, an object may be disposed, or trapped, between the blade assembly 204 (e.g., the blade edges 220A-220C, etc.) and the roadway surface 120 preventing the debris clearing device 110 from moving into the deployed position. In some embodiments, the lift actuator 304 may be jammed, bent, or otherwise incapable of moving the debris clearing device 110 into the deployed position. In any event, when both of the limit switches 320A-320B, 614 are "off," the debris clearing device 110 may not be determined to be in a retracted or a deployed position. In one embodiment, at least one of the limit switches 320A-320B, 614 may be faulty (e.g., reporting an "off" state when in an "on" state, etc.). A fault detection, or diagnostic, signal may be sent to the limit switches 320A-320B, 614 to determine any faults. When determined to have a defect, the faulty limit switches 320A-320B, 614 should be replaced and/or repaired immediately.

Based on the error state, or condition, determined in step 740, the method 700 may continue by rendering error condition instructions to the display device 412, 616 (step 744). The error condition instructions may comprise information on the error condition determined (e.g., a blockage, a jam, a defective switch, etc.) and/or how to fix the error condition (e.g., check for a blockage or jam, reverse the actuation input provided, and/or replace a component, etc.). The error condition instructions may be rendered to the display device 412, 616 in the form of a pop-up, a window, and/or some other message. The method 700 may end at step 748. In some embodiments, the method 700 may repeat from step 708.

Any of the steps, functions, and operations discussed herein can be performed continuously and automatically.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

As should be appreciated by one skilled in the art, aspects of the present disclosure have been illustrated and described herein in any of a number of patentable classes or context including any new and useful process, machine, manufacture, or composition of matter, or any new and useful improvement thereof.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or mobile platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a debris clearing device, comprising: a front blade portion having a front surface and a rear surface, the front blade portion extending a width from a first end to a second end; a first angled blade portion disposed at the first end and angled relative to the front blade portion; and a second angled blade portion disposed at the second end and angled relative to the front blade portion, wherein the first and second angled blade portions are disposed behind the front surface of the front blade portion; wherein the debris clearing device is sized to fit behind a front bumper of a vehicle, wherein the debris clearing device is moveable between a retracted state and a deployed state, wherein, in the retracted state, the debris clearing device is disposed behind the front bumper and a lowermost portion of the front blade portion is disposed adjacent to a lower edge of the front bumper, and wherein, in the deployed state, the debris clearing device is disposed behind the front bumper and lowered toward a roadway surface such that the lowermost portion of the front blade portion is offset from the roadway surface a clearance distance.

Aspects of the above debris clearing device include wherein the clearance distance is less than 1.0 inch, and wherein, in the retracted state, the clearance distance is greater than 4.0 inches.

Embodiments of the present disclosure include a roadway debris clearing system, comprising: a debris clearing device, comprising: a front blade portion having a front surface and a rear surface, the front blade portion extending a width from a first end to a second end; a first angled blade portion disposed at the first end and angled relative to the front blade portion; and a second angled blade portion disposed at the second end and angled relative to the front blade portion, wherein the first and second angled blade portions are disposed behind the front surface of the front blade portion; wherein the debris clearing device is sized to fit behind a front bumper of a vehicle, wherein the debris clearing device is moveable between a retracted state and a deployed state, wherein, in the retracted state, the debris clearing device is disposed behind the front bumper and a lowermost portion of the front blade portion is disposed adjacent to a lower edge of the front bumper, and wherein, in the deployed state, the debris clearing device is disposed behind the front bumper and lowered toward a roadway surface such that the lowermost portion of the front blade portion is offset from the roadway surface a clearance distance; a mount frame configured to be attached to a frame of the vehicle; a support arm pivotally connected to the debris clearing device and the mount frame, wherein movement of the debris clearing device between the retracted state and the deployed state moves the support arm; a lift chain interconnected to the debris clearing device; and a motor attached to the mount frame, comprising a drive shaft and drive gear, wherein the drive gear is operatively connected to the lift chain, wherein turning the motor in a first rotational direction moves the debris clearing device from the retracted state to the deployed state, and wherein turning the motor in an opposite second rotational direction moves the debris clearing device from the deployed state to the retracted state.

Aspects of the above roadway debris clearing system further comprise: Aspects of the above roadway debris clearing system further comprise: a first camera disposed adjacent to the front bumper and angled toward an area in front of the vehicle; a display device operatively connected to the first camera, wherein images from the first camera are rendered to the display device, and wherein the display device renders the images from the first camera when the debris clearing device is in the deployed state. Aspects of the above roadway debris clearing system further comprise: a second camera disposed behind the front bumper and angled toward an area under the front bumper and a portion of the debris clearing device in the deployed state, wherein images from the second camera are rendered to the display device along with the images from the first camera, and wherein the images from the second camera provide a close-up view of the debris clearing device.

Embodiments of the present disclosure include a debris clearing device for a vehicle, comprising: a blade assembly, comprising: a front blade portion having a front surface facing a front of the blade assembly and a rear surface facing a rear of the blade assembly, the front blade portion extending a width from a first end to a second end and extending a height from an upper edge to a lower edge; a first angled blade portion attached to the front blade portion at the first end and disposed at a first angle relative to the front blade portion such that the first angled blade portion extends away from a center of the blade assembly in a first direction running to the rear of the blade assembly; and a second angled blade portion attached to the front blade portion at the second end and disposed at a second angle relative to the front blade portion such that the second angled blade portion extends away from the center of the blade assembly in a second direction running to the rear of the blade assembly; and a blade mount assembly, comprising: a lift frame pivotally attached via a first set of lift arm ends to the rear surface of front blade portion and extending a length to the rear of the blade assembly and away from the rear surface of front blade portion terminating at a second set of lift arm ends; and an actuator mount attached to the rear surface of the front blade portion and comprising a recess that receives a portion of a lift actuator, wherein the blade mount assembly pivotally attaches to a frame of the vehicle via the second set of lift arm ends, wherein the debris clearing device is moveable between a retracted state and a deployed state by actuating the lift actuator engaged with the actuator mount, wherein, in the retracted state, the debris clearing device is maintained in a raised position behind a front bumper of the vehicle and the lower edge of the front blade portion is disposed adjacent to a lowermost edge of the front bumper, wherein, in the deployed state, the debris clearing device is maintained in a lowered position behind the front bumper and the lower edge of the front blade portion is disposed a distance away from the lowermost edge of the front bumper exposing a portion of the front blade portion in a space between the lowermost edge of the front bumper and a roadway surface.

Aspects of the above debris clearing device include wherein the blade assembly further comprises: a first metal plate disposed at the first end of the front blade portion running along the first end from the upper edge to the lower edge, the first metal plate protruding a claw distance from the front surface of the front blade portion; and a second metal plate disposed at the second end of the front blade portion running along the second end from the upper edge to the lower edge, the second metal plate protruding the claw distance from the front surface of the front blade portion. Aspects of the above debris clearing device include wherein the blade assembly further comprises: a third metal plate disposed at an end of the first angled blade portion arranged furthest from the center of the blade assembly, the third metal plate protruding the claw distance from a front surface of the first angled blade portion; and a fourth metal plate disposed at an end of the second angled blade portion arranged furthest from the center of the blade assembly, the fourth metal plate protruding the claw distance from a front surface of the second angled blade portion. Aspects of the above debris clearing device include wherein at least one of the first metal plate, the second metal plate, the third metal plate, and the fourth metal plate comprises a bent portion of metal comprising a plurality of teeth angled toward a plane running through the center of the blade assembly. Aspects of the above debris clearing device include wherein the first angle and the second angle each measure between 10 degrees and 45 degrees from the front surface of the front blade portion. Aspects of the above debris clearing device include wherein the lower edge of the front blade portion is disposed at a clearing distance less than 1.0 inch from the roadway surface in the deployed state, and wherein, in the retracted state, the lower edge of the front blade portion is disposed at a clearance distance greater than 4.0 inches from the roadway surface. Aspects of the above debris clearing device include wherein the front surface of the front blade portion comprises a concave cross-section running along the width. Aspects of the above debris clearing device include wherein at least one of the front blade portion, the first angled blade portion, and the second angled blade portion comprises an attached replaceable blade edge fastened by a plurality of bolts, and wherein the lower edge is a lowermost portion of the attached replaceable blade edge on the front blade portion.

Embodiments of the present disclosure include a roadway debris clearing system, comprising: a debris clearing device for a vehicle, comprising: a blade assembly, comprising: a front blade portion having a front surface facing a front of the blade assembly and a rear surface facing a rear of the blade assembly, the front blade portion extending a width from a first end to a second end and extending a height from an upper edge to a lower edge; a first angled blade portion attached to the front blade portion at the first end and disposed at a first angle relative to the front blade portion such that the first angled blade portion extends away from a center of the blade assembly in a first direction running to the rear of the blade assembly; and a second angled blade portion attached to the front blade portion at the second end and disposed at a second angle relative to the front blade portion such that the second angled blade portion extends away from the center of the blade assembly in a second direction running to the rear of the blade assembly; and a blade mount assembly, comprising: a lift frame pivotally attached via a first set of lift arm ends to the rear surface of front blade portion and extending a length to the rear of the blade assembly and away from the rear surface of front blade portion terminating at a second set of lift arm ends, wherein the blade mount assembly pivotally attaches to a frame of the vehicle via the second set of lift arm ends; and an actuator mount attached to the rear surface of the front blade portion; and a lift actuator comprising a first end and a second end, wherein the first end is attachable to a frame of the vehicle, wherein the second end is engaged with the actuator mount, and wherein the lift actuator is moveable between a retracted position and an extended position, wherein, in the retracted position, the lift actuator maintains the blade assembly of the debris clearing device in a raised position behind a front bumper of the vehicle in a retracted state such that the lower edge of the front blade portion is disposed adjacent to a lowermost edge of the front bumper, wherein, in the extended position, the lift actuator maintains the blade assembly of the debris clearing device in a lowered position behind the front bumper of the vehicle in a deployed state and the lower edge of the front blade portion is disposed a distance away from the lowermost edge of the front bumper exposing a portion of the front blade portion in a space between the lowermost edge of the front bumper and a roadway surface.

Aspects of the above roadway debris clearing system further comprise: a first camera disposed adjacent to the front bumper of the vehicle and angled toward an area in front of the vehicle; and a display device operatively connected to the first camera, wherein images from the first camera are rendered by the display device, and wherein the display device renders the images from the first camera when the blade assembly of the debris clearing device is in the deployed state. Aspects of the above roadway debris clearing system further comprise: Aspects of the above roadway debris clearing system further comprise: a second camera disposed behind the front bumper of the vehicle and angled toward an area under the front bumper and a portion of the blade assembly of the debris clearing device in the deployed state, wherein images from the second camera are rendered by the display device along with the images from the first camera, and wherein the images from the second camera provide a close-up view of an area of the debris clearing device. Aspects of the above roadway debris clearing system include wherein the lift actuator is a fluid-actuated cylinder, and wherein the fluid-actuated cylinder moves between the retracted position and the extended position via a controlled flow of a fluid to a piston of the fluid-actuated cylinder. Aspects of the above roadway debris clearing system further comprise: wherein the fluid is a hydraulic fluid, wherein actuation of a control valve in fluid communication with the fluid-actuated cylinder from a first position to a second position moves the fluid-actuated cylinder from the retracted position to the extended position, and wherein actuation of the control valve from the second position to the first position moves the fluid-actuated cylinder from the extended position to the retracted position.

Embodiments of the present disclosure include a roadway debris clearing system, comprising: a vehicle, comprising: a frame; and a front bumper attached to the frame, the front bumper comprising a bumper height running from an uppermost edge to a lowermost edge, wherein an area between the lowermost edge and a roadway surface defines a clearance distance for the front bumper; a debris clearing device, comprising: a blade assembly, comprising: a front blade portion having a front surface facing a front of the blade assembly and a rear surface facing a rear of the blade assembly, the front blade portion extending a width from a first end to a second end and extending a height from an upper edge to a lower edge; a first angled blade portion attached to the front blade portion at the first end and disposed at a first angle relative to the front blade portion such that the first angled blade portion extends away from a center of the blade assembly in a first direction running to the rear of the blade assembly; and a second angled blade portion attached to the front blade portion at the second end and disposed at a second angle relative to the front blade portion such that the second angled blade portion extends away from the center of the blade assembly in a second direction running to the rear of the blade assembly; and a blade mount assembly, comprising: a lift frame pivotally attached via a first set of lift arm ends to the rear surface of front blade portion and extending a length to the rear of the blade assembly and away from the rear surface of front blade portion terminating at a second set of lift arm ends, wherein the blade mount assembly pivotally attaches to the frame of the vehicle via the second set of lift arm ends; and an actuator mount attached to the rear surface of the front blade portion; and a lift actuator comprising a first end and a second end, wherein the first end is attached to the frame of the vehicle, wherein the second end is engaged with the actuator mount, and wherein the lift actuator is moveable between a retracted position and an extended position, wherein, in the retracted position, the lift actuator maintains the blade assembly of the debris clearing device in a raised position behind the front bumper of the vehicle in a retracted state such that the lower edge of the front blade portion is disposed adjacent to a lowermost edge of the front bumper, wherein, in the extended position, the lift actuator maintains the blade assembly of the debris clearing device in a lowered position behind the front bumper of the vehicle in a deployed state and the lower edge of the front blade portion is disposed a distance away from the lowermost edge of the front bumper exposing a portion of the front blade portion in a space between the lowermost edge of the front bumper and a roadway surface.

Aspects of the above roadway debris clearing system include wherein the blade assembly further comprises: a first metal plate disposed at the first end of the front blade portion running along the first end from the upper edge to the lower edge, the first metal plate protruding a claw distance from the front surface of the front blade portion; a second metal plate disposed at the second end of the front blade portion running along the second end from the upper edge to the lower edge, the second metal plate protruding the claw distance from the front surface of the front blade portion; a third metal plate disposed at an end of the first angled blade portion arranged furthest from the center of the blade assembly, the third metal plate protruding the claw distance from a front surface of the first angled blade portion; and a fourth metal plate disposed at an end of the second angled blade portion arranged furthest from the center of the blade assembly, the fourth metal plate protruding the claw distance from a front surface of the second angled blade portion, wherein at least one of the first metal plate, the second metal plate, the third metal plate, and the fourth metal plate comprises a bent portion of metal comprising a plurality of teeth angled toward a plane running through the center of the blade assembly. Aspects of the above roadway debris clearing system include wherein the first angle and the second angle each measure between 10 degrees and 45 degrees from the front surface of the front blade portion, and wherein the front surface of the front blade portion comprises a concave cross-section running along the width. Aspects of the above roadway debris clearing system include wherein the blade assembly is vertically concealed within the bumper height in the retracted state, and wherein the blade assembly is vertically exposed at least partially outside the bumper height in the deployed state. Aspects of the above roadway debris clearing system further comprise: a first camera disposed adjacent to the front bumper of the vehicle and angled toward an area in front of the vehicle; and a display device operatively connected to the first camera, wherein images from the first camera are rendered by the display device, and wherein the display device renders the images from the first camera when the blade assembly of the debris clearing device is in the deployed state. Aspects of the above roadway debris clearing system further comprise: a second camera disposed behind the front bumper of the vehicle and angled toward an area under the front bumper and a portion of the blade assembly of the debris clearing device in the deployed state, wherein images from the second camera are rendered by the display device along with the images from the first camera, and wherein the images from the second camera provide a close-up view of an area of the debris clearing device. Aspects of the above roadway debris clearing system include wherein the lift actuator is a fluid-actuated cylinder, wherein the fluid-actuated cylinder moves between the retracted position and the extended position via a controlled flow of a fluid to a piston of the fluid-actuated cylinder, wherein the fluid is a hydraulic fluid, wherein actuation of a control valve in fluid communication with the fluid-actuated cylinder from a first position to a second position moves the fluid-actuated cylinder from the retracted position to the extended position, and wherein actuation of the control valve from the second position to the first position moves the fluid-actuated cylinder from the extended position to the retracted position.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A debris clearing device for a vehicle, comprising:
    a blade assembly, comprising:
        a front blade portion having a front surface facing a front of the blade assembly and a rear surface facing a rear of the blade assembly, the front blade portion extending a width from a first end to a second end and extending a height from an upper edge to a lower edge;
        a first angled blade portion attached to the front blade portion at the first end and disposed at a first angle relative to the front blade portion such that the first angled blade portion extends away from a center of the blade assembly in a first direction running to the rear of the blade assembly; and
        a second angled blade portion attached to the front blade portion at the second end and disposed at a second angle relative to the front blade portion such that the second angled blade portion extends away from the center of the blade assembly in a second direction running to the rear of the blade assembly; and
    a blade mount assembly, comprising:
        a lift frame pivotally attached via a first set of lift arm ends to the rear surface of front blade portion and extending a length to the rear of the blade assembly and away from the rear surface of front blade portion terminating at a second set of lift arm ends; and
        an actuator mount attached to the rear surface of the front blade portion and comprising a recess that receives a portion of a lift actuator,
        wherein the blade mount assembly pivotally attaches to a frame of the vehicle via the second set of lift arm ends, wherein the debris clearing device is moveable between a retracted state and a deployed state by actuating the lift actuator engaged with the actuator mount, wherein, in the retracted state, the debris clearing device is maintained in a raised position behind a front bumper of the vehicle and the lower edge of the front blade portion is disposed adjacent to a lowermost edge of the front bumper, wherein, in the deployed state, the debris clearing device is maintained in a lowered position behind the front bumper and the lower edge of the front blade portion is disposed a distance away from the lowermost edge of the front bumper exposing a portion of the front blade portion in a space between the lowermost edge of the front bumper and a roadway surface.

2. The debris clearing device of claim 1, wherein the blade assembly further comprises:
a first metal plate disposed at the first end of the front blade portion running along the first end from the upper edge to the lower edge, the first metal plate protruding a claw distance from the front surface of the front blade portion; and
a second metal plate disposed at the second end of the front blade portion running along the second end from the upper edge to the lower edge, the second metal plate protruding the claw distance from the front surface of the front blade portion.

3. The debris clearing device of claim 2, wherein the blade assembly further comprises:
a third metal plate disposed at an end of the first angled blade portion arranged furthest from the center of the blade assembly, the third metal plate protruding the claw distance from a front surface of the first angled blade portion; and
a fourth metal plate disposed at an end of the second angled blade portion arranged furthest from the center of the blade assembly, the fourth metal plate protruding the claw distance from a front surface of the second angled blade portion.

4. The debris clearing device of claim 3, wherein at least one of the first metal plate, the second metal plate, the third metal plate, and the fourth metal plate comprises a bent portion of metal comprising a plurality of teeth angled toward a plane running through the center of the blade assembly.

5. The debris clearing device of claim 1, wherein the first angle and the second angle each measure between 10 degrees and 45 degrees from the front surface of the front blade portion.

6. The debris clearing device of claim 5, wherein the lower edge of the front blade portion is disposed at a clearing distance less than 1.0 inch from the roadway surface in the deployed state, and wherein, in the retracted state, the lower edge of the front blade portion is disposed at a clearance distance greater than 4.0 inches from the roadway surface.

7. The debris clearing device of claim 6, wherein the front surface of the front blade portion comprises a concave cross-section running along the width.

8. The debris clearing device of claim 7, wherein at least one of the front blade portion, the first angled blade portion, and the second angled blade portion comprises an attached replaceable blade edge fastened by a plurality of bolts, and wherein the lower edge is a lowermost portion of the attached replaceable blade edge on the front blade portion.

9. A roadway debris clearing system, comprising:
a debris clearing device for a vehicle, comprising:
a blade assembly, comprising:
a front blade portion having a front surface facing a front of the blade assembly and a rear surface facing a rear of the blade assembly, the front blade portion extending a width from a first end to a second end and extending a height from an upper edge to a lower edge;
a first angled blade portion attached to the front blade portion at the first end and disposed at a first angle relative to the front blade portion such that the first angled blade portion extends away from a center of the blade assembly in a first direction running to the rear of the blade assembly; and
a second angled blade portion attached to the front blade portion at the second end and disposed at a second angle relative to the front blade portion such that the second angled blade portion extends away from the center of the blade assembly in a second direction running to the rear of the blade assembly; and
a blade mount assembly, comprising:
a lift frame pivotally attached via a first set of lift arm ends to the rear surface of front blade portion and extending a length to the rear of the blade assembly and away from the rear surface of front blade portion terminating at a second set of lift arm ends, wherein the blade mount assembly pivotally attaches to a frame of the vehicle via the second set of lift arm ends; and
an actuator mount attached to the rear surface of the front blade portion; and
a lift actuator comprising a first end and a second end, wherein the first end is attachable to a frame of the vehicle, wherein the second end is engaged with the actuator mount, and wherein the lift actuator is moveable between a retracted position and an extended position, wherein, in the retracted position, the lift actuator maintains the blade assembly of the debris clearing device in a raised position behind a front bumper of the vehicle in a retracted state such that the lower edge of the front blade portion is disposed adjacent to a lowermost edge of the front bumper, wherein, in the extended position, the lift actuator maintains the blade assembly of the debris clearing device in a lowered position behind the front bumper of the vehicle in a deployed state and the lower edge of the front blade portion is disposed a distance away from the lowermost edge of the front bumper exposing a portion of the front blade portion in a space between the lowermost edge of the front bumper and a roadway surface.

10. The roadway debris clearing system of claim 9, further comprising:
a first camera disposed adjacent to the front bumper of the vehicle and angled toward an area in front of the vehicle; and
a display device operatively connected to the first camera, wherein images from the first camera are rendered by the display device, and wherein the display device renders the images from the first camera when the blade assembly of the debris clearing device is in the deployed state.

11. The roadway debris clearing system of claim 10, further comprising:
a second camera disposed behind the front bumper of the vehicle and angled toward an area under the front bumper and a portion of the blade assembly of the debris clearing device in the deployed state, wherein images from the second camera are rendered by the display device along with the images from the first camera, and wherein the images from the second camera provide a close-up view of an area of the debris clearing device.

12. The roadway debris clearing system of claim 9, wherein the lift actuator is a fluid-actuated cylinder, and wherein the fluid-actuated cylinder moves between the retracted position and the extended position via a controlled flow of a fluid to a piston of the fluid-actuated cylinder.

13. The roadway debris clearing system of claim 12, wherein the fluid is a hydraulic fluid, wherein actuation of a control valve in fluid communication with the fluid-actuated cylinder from a first position to a second position moves the fluid-actuated cylinder from the retracted position to the extended position, and wherein actuation of the control valve from the second position to the first position moves the fluid-actuated cylinder from the extended position to the retracted position.

14. A roadway debris clearing system, comprising:
a vehicle, comprising:
a frame; and
a front bumper attached to the frame, the front bumper comprising a bumper height running from an uppermost edge to a lowermost edge, wherein an area between the lowermost edge and a roadway surface defines a clearance distance for the front bumper;
a debris clearing device, comprising:
a blade assembly, comprising:
a front blade portion having a front surface facing a front of the blade assembly and a rear surface facing a rear of the blade assembly, the front blade portion extending a width from a first end to a second end and extending a height from an upper edge to a lower edge;
a first angled blade portion attached to the front blade portion at the first end and disposed at a first angle relative to the front blade portion such that the first angled blade portion extends away from a center of the blade assembly in a first direction running to the rear of the blade assembly; and
a second angled blade portion attached to the front blade portion at the second end and disposed at a second angle relative to the front blade portion such that the second angled blade portion extends away from the center of the blade assembly in a second direction running to the rear of the blade assembly; and
a blade mount assembly, comprising:
a lift frame pivotally attached via a first set of lift arm ends to the rear surface of front blade portion and extending a length to the rear of the blade assembly and away from the rear surface of front blade portion terminating at a second set of lift arm ends, wherein the blade mount assembly pivotally attaches to the frame of the vehicle via the second set of lift arm ends; and
an actuator mount attached to the rear surface of the front blade portion; and
a lift actuator comprising a first end and a second end, wherein the first end is attached to the frame of the vehicle, wherein the second end is engaged with the actuator mount, and wherein the lift actuator is moveable between a retracted position and an extended position, wherein, in the retracted position, the lift actuator maintains the blade assembly of the debris clearing device in a raised position behind the front bumper of the vehicle in a retracted state such that the lower edge of the front blade portion is disposed adjacent to a lowermost edge of the front bumper, wherein, in the extended position, the lift actuator maintains the blade assembly of the debris clearing device in a lowered position behind the front bumper of the vehicle in a deployed state and the lower edge of the front blade portion is disposed a distance away from the lowermost edge of the front bumper exposing a portion of the front blade portion in a space between the lowermost edge of the front bumper and a roadway surface.

15. The roadway debris clearing system of claim 14, wherein the blade assembly further comprises:
a first metal plate disposed at the first end of the front blade portion running along the first end from the upper edge to the lower edge, the first metal plate protruding a claw distance from the front surface of the front blade portion;
a second metal plate disposed at the second end of the front blade portion running along the second end from the upper edge to the lower edge, the second metal plate protruding the claw distance from the front surface of the front blade portion;
a third metal plate disposed at an end of the first angled blade portion arranged furthest from the center of the blade assembly, the third metal plate protruding the claw distance from a front surface of the first angled blade portion; and
a fourth metal plate disposed at an end of the second angled blade portion arranged furthest from the center of the blade assembly, the fourth metal plate protruding the claw distance from a front surface of the second angled blade portion,
wherein at least one of the first metal plate, the second metal plate, the third metal plate, and the fourth metal plate comprises a bent portion of metal comprising a plurality of teeth angled toward a plane running through the center of the blade assembly.

16. The debris clearing device of claim 15, wherein the first angle and the second angle each measure between 10 degrees and 45 degrees from the front surface of the front blade portion, and wherein the front surface of the front blade portion comprises a concave cross-section running along the width.

17. The roadway debris clearing system of claim 14, wherein the blade assembly is vertically concealed within the bumper height in the retracted state, and wherein the blade assembly is vertically exposed at least partially outside the bumper height in the deployed state.

18. The roadway debris clearing system of claim 14, further comprising:
a first camera disposed adjacent to the front bumper of the vehicle and angled toward an area in front of the vehicle; and
a display device operatively connected to the first camera, wherein images from the first camera are rendered by the display device, and wherein the display device renders the images from the first camera when the blade assembly of the debris clearing device is in the deployed state.

19. The roadway debris clearing system of claim 18, further comprising:
a second camera disposed behind the front bumper of the vehicle and angled toward an area under the front bumper and a portion of the blade assembly of the debris clearing device in the deployed state, wherein images from the second camera are rendered by the display device along with the images from the first camera, and wherein the images from the second camera provide a close-up view of an area of the debris clearing device.

20. The roadway debris clearing system of claim 14, wherein the lift actuator is a fluid-actuated cylinder, wherein the fluid-actuated cylinder moves between the retracted position and the extended position via a controlled flow of a fluid to a piston of the fluid-actuated cylinder, wherein the fluid is a hydraulic fluid, wherein actuation of a control valve in fluid communication with the fluid-actuated cylinder from a first position to a second position moves the fluid-actuated cylinder from the retracted position to the extended position, and wherein actuation of the control valve from the second position to the first position moves the fluid-actuated cylinder from the extended position to the retracted position.

* * * * *